United States Patent
Kiss et al.

(10) Patent No.: US 8,067,512 B2
(45) Date of Patent: Nov. 29, 2011

(54) MONOMER/SOLVENT SEPARATION AND RECYCLE PROCESS FOR PROPYLENE CONTAINING POLYMERS

(75) Inventors: Gabor Kiss, Hampton, NJ (US); James Richardson Lattner, LaPorte, TX (US)

(73) Assignee: Exxonmobil Research and Engineering Company, Annandale, NJ (US)

( * ) Notice: Subject to any disclaimer, the term of this patent is extended or adjusted under 35 U.S.C. 154(b) by 329 days.

(21) Appl. No.: 12/384,401

(22) Filed: Apr. 3, 2009

(65) Prior Publication Data

US 2009/0259005 A1 Oct. 15, 2009

Related U.S. Application Data

(60) Provisional application No. 61/123,625, filed on Apr. 10, 2008.

(51) Int. Cl.
*C08F 2/00* (2006.01)
*C08F 110/06* (2006.01)

(52) U.S. Cl. ........... 526/68; 526/73; 526/77; 526/351

(58) Field of Classification Search ............. 526/68, 526/73, 77, 351
See application file for complete search history.

(56) References Cited

U.S. PATENT DOCUMENTS

| | | | |
|---|---|---|---|
| 4,319,021 A | 3/1982 | Irani et al. | |
| 5,811,496 A | 9/1998 | Iwasyk et al. | |
| 7,163,989 B2 * | 1/2007 | Friedersdorf | 526/68 |
| 7,279,536 B2 | 10/2007 | Brant et al. | |
| 7,354,979 B2 | 4/2008 | Brant et al. | |
| 2008/0090974 A1 | 4/2008 | Brant et al. | |
| 2008/0153996 A1 | 6/2008 | Friedersdorf et al. | |
| 2008/0234443 A1 | 9/2008 | Kiss et al. | |
| 2008/2147677 | 9/2008 | Mehta et al. | |

OTHER PUBLICATIONS

U.S. Appl. No. 12/016,346, filed Jan. 18, 2008, commonly owned co-pending application.
U.S. Appl. No. 12/074,496, filed Mar. 4, 2008, commonly owned co-pending application.

\* cited by examiner

*Primary Examiner* — William Cheung
(74) *Attorney, Agent, or Firm* — Robert A. Migliorini

(57) ABSTRACT

Monomer/solvent separation and recycle processes for continuous supercritical, solution and advanced solution polymerization processes for propylene-containing polymers and their blends are provided. The advantageous monomer/solvent separation and recycle process includes heating a polymer-lean recycle stream coming from a gravimetric separator positioned downstream of the reactor to form a heated polymer-lean recycle stream, and subsequently combining the heated polymer-lean recycle stream with the one or more homogenous reactor effluent streams to form a heated reactor effluent mixed stream. The heated reactor effluent mixed stream may then be passed through a pressure let-down valve followed and a gravimetric separator, such as to provide for reduced fouling propensity of the polymer-rich phase and sufficient heating of the polymer-rich phase to be able to pass through the remainder of the processing steps to form a propylene based polymer product without additional heat.

31 Claims, 6 Drawing Sheets

US 8,067,512 B2

MONOMER/SOLVENT SEPARATION AND RECYCLE PROCESS FOR PROPYLENE CONTAINING POLYMERS

CROSS-REFERENCE TO RELATED APPLICATIONS

This application claims priority to U.S. Provisional Application Ser. No. 61/123,625 filed on Apr. 10, 2008, herein incorporated by reference in its entirety.

FIELD

The present disclosure relates to the field of polymer processing. It more particularly relates to a monomer/solvent separation and recycle process for the production of propylene-containing polymers. Still more particularly, the present disclosure relates to a monomer/solvent separation and recycle process for polymerization plants making propylene-containing polymers and blends thereof under supercritical, solution, and advanced solution polymerization conditions.

BACKGROUND

Advanced solution polymerization processes, as described in U.S. patent application Ser. No. 11/961,583 involve increased monomer concentrations in the polymerization reactor(s) delivering polymeric products with improved properties, such as higher molecular weight and melting/crystallization temperatures. Similar advantages are disclosed for supercritical polymerization as described in U.S. patent application Ser. No. 10/667,585. For the case of the production of the isotactic polypropylene using the advanced solution and supercritical polymerization process, the higher propylene concentration enables the production of highly crystalline isotactic polypropylenes with sufficiently low melt flow rates. Higher monomer concentrations also enable higher polymer concentrations in the reactor effluent thus reducing the monomer recycle ratio and with it the cost of monomer and solvent recycle. Both processes are performed in homogeneous dense fluid polymerization systems.

Homogeneous polymerization processes, such as supercritical, solution, and advanced solution polymerization, advantageously employ phase separators for recovering the bulk of the low molecular weight monomer and solvent components from the reactor effluent for recycle as described in U.S. patent application Ser. No. 11/854,93. The separation process involves heating the reactor effluent before letting its pressure down to rapidly cross the fluid-fluid phase separation boundary from the single-phase to the two-phase region in the phase diagram. The heating step needs to introduce enough heat to cover the enthalpy of evaporation of the solvent and monomer remnants after phase separation, plus the heat required to stay above the melting point of the polymer, as described in U.S. Pat. No. 7,163,989. With solution polymerization processes, for example, this entails raising the temperature of the reactor effluent from around 50 to 90° C. to about 160 to 200° C. in a heat exchanger. The maximum temperature typically is limited by the reactor effluent crossing into the two-phase region upon heating, due to the reduced solvency at increasing temperatures. If a polymer-rich phase forms in the heat-exchanger, it tends to foul the heat exchanger, resulting in a substantial deterioration of the heat transfer coefficient and other plant operation problems.

This limitation becomes even more severe in the advanced solution and supercritical polymerization processes described in U.S. patent application Ser. Nos. 11/961,583 and 10/667,585 respectively, because the solvency of the reactor effluent is reduced by the higher monomer concentration, i.e., the monomers are poorer solvents for the product polymer than the inert solvent (typically paraffinic hydrocarbons, such as hexanes or octanes, etc.). This issue may limit the temperature to which the reactor effluent can be heated and/or the maximum polymer concentration in the reactor effluent, and correspondingly, may lead to difficulties in removing the solvent and monomer remnants from the final product and increase the volume and cost of recycle, and reduce plant capacity for a given separation and devolatilization train.

Hence, there is a need for an improved monomer separation and recycle process that can reduce or even eliminate these limitations caused by the increased monomer concentrations in the reactor effluent. The improvements can be particularly advantageous for the supercritical and advanced solution polymerization processes due to their typically lower concentration of solvents in the polymer-containing reactor effluents resulting in lower fluid-fluid phase separation temperatures as compared to the conventional solution processes practiced today. In regard to supercritical and advanced solution polymerization processes, an improved monomer separation and recycle process would allow all the benefits of the increased monomer concentration, namely the improved product capability, and reduced cost of monomer and solvent recycle to be captured. Nonetheless, the disclosed monomer/solvent separation-recycle process configurations provide advantages even in a conventional solution polymerization plant operating with higher solvent concentrations by providing a reduced risk of fouling in the separation-recycle train.

SUMMARY

Monomer/solvent separation and recycle processes are provided for continuous homogeneous polymerization processes, such as supercritical, solution and advanced solution polymerization, to produce propylene-containing polymers and their blends.

According to the present disclosure, an advantageous monomer/solvent separation and recycle process for continuous homogeneous polymerization processes comprises providing one or more series or parallel homogeneous polymerization reactors yielding one or more high-pressure reactor effluent streams and a downstream gravimetric separator fluidly connected to the one or more reactors; pressurizing a polymer-lean stream from the gravimetric separator to form a high-pressure polymer-lean recycle stream; splitting the high-pressure polymer-lean recycle stream into two high-pressure polymer-lean recycle streams; heating one of the high-pressure polymer-lean recycle streams to form a heated high-pressure polymer-lean recycle stream; combining the heated high-pressure polymer-lean recycle stream with the one or more high-pressure reactor effluent streams to form a heated high-pressure reactor effluent mixed stream; passing the heated high-pressure reactor effluent mixed stream through a pressure let-down valve to form a heated low-pressure reactor effluent mixed stream; and passing the heated low-pressure reactor effluent mixed stream through the gravimetric separator to form the polymer-lean stream for recycle and a polymer-rich stream for further processing.

A further aspect of the present disclosure relates to an advantageous monomer/solvent separation and recycle process for a continuous homogeneous polymerization process comprising providing one or more series or parallel homogeneous polymerization reactors yielding one or more high-pressure reactor effluent streams and a downstream gravimetric separator fluidly connected to the one or more reactors;

splitting a low-pressure polymer-lean stream from the gravimetric separator into two low-pressure polymer-lean recycle streams; heating one of the low-pressure polymer-lean recycle streams to form a heated low-pressure polymer-lean recycle stream; passing the one or more high-pressure reactor effluent streams through one or more pressure let-down valves to form one or more low-pressure reactor effluent streams; combining the one or more low-pressure reactor effluent streams with the heated low-pressure polymer-lean recycle stream to form a heated low-pressure reactor effluent mixed stream; and passing the heated low-pressure reactor effluent mixed stream through the gravimetric separator to form the polymer-lean stream for recycle and a polymer-rich stream for further processing.

Another aspect of the present disclosure relates to an advantageous monomer/solvent separation and recycle process for a continuous homogeneous polymerization process comprising providing one or more series or parallel homogenous polymerization reactors yielding one or more high-pressure reactor effluent streams and a downstream gravimetric separator fluidly connected to the one or more reactors; pressurizing a polymer-lean stream from the gravimetric separator to form a high-pressure polymer-lean recycle stream; splitting the high-pressure polymer-lean recycle stream into two high-pressure polymer-lean recycle streams; combining one of the high-pressure polymer-lean recycle streams with the one or more high-pressure reactor effluent streams to form a high-pressure reactor effluent mixed stream; heating the high-pressure reactor effluent mixed stream to form a heated high-pressure reactor effluent mixed stream; passing the heated high-pressure reactor effluent mixed stream through a pressure let-down valve to form a heated low-pressure reactor effluent mixed stream; and passing the heated low-pressure reactor effluent mixed stream through the gravimetric separator to form the polymer-lean stream for recycle and a polymer-rich stream for further processing.

These and other features and attributes of the disclosed processes for monomer/solvent separation and recycle in a continuous homogeneous polymerization process of the present disclosure and their advantageous applications and/or uses will be apparent from the detailed description which follows, particularly when read in conjunction with the figures appended hereto.

BRIEF DESCRIPTION OF THE DRAWINGS

To assist those of ordinary skill in the relevant art in making and using the subject matter hereof, reference is made to the appended drawings, wherein.

DEFINITIONS

Figure 1:
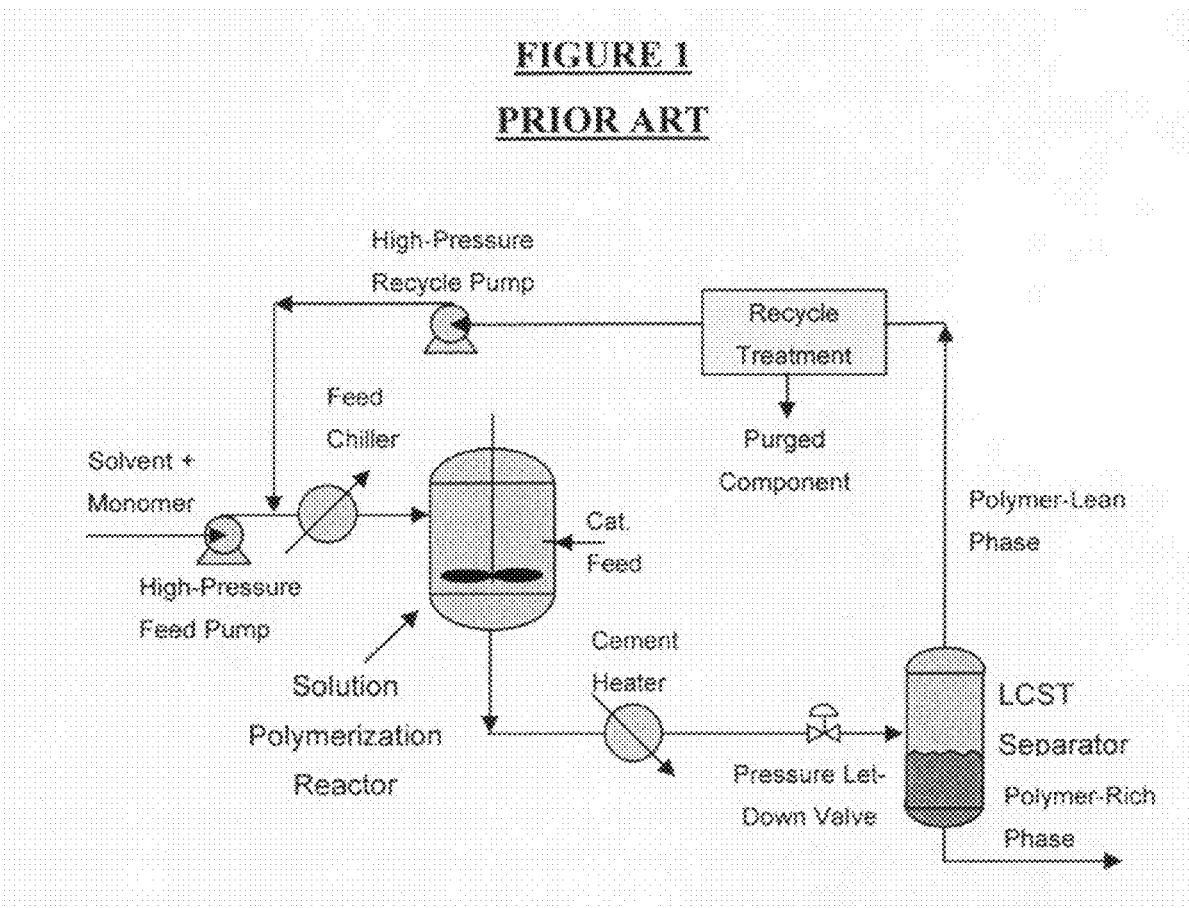
FIG. 1 depicts an exemplary schematic of a prior art monomer/solvent separation and recycle process with no polymer-lean recycle stream added to the reactor effluent upstream of the gravimetric separator.

For purposes of this disclosure and the claims thereto.

A catalyst system is defined to be the combination of one or more catalyst precursor compounds and one or more activators. Note that although themselves are not catalytically active (need to be combined with an activator to become active), the catalyst precursor compounds are often referred to as catalysts in the art of polymerization. Any part of the catalyst system can be optionally supported on solid particles, in which case the support is also part of the catalyst system.

Dense fluids are defined as fluid media in their liquid or supercritical state with densities greater than $300 \, kg/m^3$. Note that gas-phase fluids are excluded from the group of dense fluids.

Solid-fluid phase transition temperature is defined as the temperature at which a solid polymer phase separates from the polymer-containing dense fluid medium at a given pressure. Note that the solid-fluid phase transition temperature is indicated by the crystallization temperature line in FIG. 6. Note also that in polymer-solvent (the solvent could be the dense fluid monomer itself or monomer-inert solvent blends) systems the crystallization and melting temperatures (the latter defined as the temperature at which a solid polymer dissolves in the surrounding dense fluid medium) are often not the same. In fact, the dissolution of solid polymers typically requires significantly higher temperatures than the solid-fluid phase transition temperature. The solid-fluid phase transition temperature can be determined by temperature reduction starting from temperatures at which the polymer is fully dissolved in the dense fluid reaction medium. At the onset of the formation of a solid polymer phase, the homogeneous fluid medium becomes turbid, which can be observed by eye or can be detected by shining a laser through the medium and detecting the sudden increase of light scattering as described in J. Vladimir Oliveira, C. Dariva and J. C. Pinto, Ind. Eng, Chem. Res. 29 (2000) 4627.

Solid-fluid phase transition pressure (crystallization pressure) is defined as the pressure at which a solid polymer phase separates from the polymer-containing fluid medium at a given temperature. The solid-fluid phase transition pressure can be determined by pressure reduction at constant temperature starting from pressures at which the polymer is fully dissolved in the fluid reaction medium. At the onset of the formation of a solid polymer phase, the homogeneous fluid medium becomes turbid, which can be observed by eye or can be detected by shining a laser through the medium and detecting the sudden increase of light scattering as described in J. Vladimir Oliveira, C. Dariva and J. C. Pinto, Ind. Eng, Chem. Res. 29 (2000) 4627.

The cloud point is defined as the pressure below which, at a given temperature, the polymer-containing homogeneous fluid medium becomes turbid upon pressure reduction at constant temperature as described in J. Vladimir Oliveira, C. Dariva and J. C. Pinto, Ind. Eng, Chem. Res. 29 (2000) 4627. For purposes of this disclosure and the claims thereto, the cloud point is measured by shining a helium laser through the selected polymerization system in a cloud point cell onto a photocell and recording the pressure at the onset of rapid increase in light scattering for a given temperature.

A higher α-olefin is defined as an a-olefin having four or more carbon atoms.

Polymerization encompasses any polymerization reaction such as homopolymerization and copolymerization.

Copolymerization encompasses any polymerization reaction of two or more monomers.

The new numbering scheme for the Periodic Table Groups is used as published in CHEMICAL AND ENGINEERING NEWS, 63(5), 27 (1985).

When a polymer is referred to as comprising an olefin, the olefin present in the polymer is the polymerized form of the olefin.

An oligomer is defined to be compositions having 2-75 monomer units.

A polymer is defined to be compositions having 76 or more monomer units.

A series reactor cascade (also referred to as series reactor configuration or reactors in series) includes two or more reactors connected in series, in which the effluent of an upstream reactor is fed to the next reactor downstream in the reactor cascade. Besides the effluent of the upstream reactor(s), the feed of any reactor can be augmented with any combination of additional monomer, catalyst, scavenger, or solvent fresh or recycled feed streams.

Reactor train or reactor branch or reactor leg refers to a single polymerization reactor or to a group of polymerization reactors of the in-line blending process disclosed herein that produces a single polymer blend component. If the reactor train contains more than one reactor, the reactors are arranged in a series configuration within the train. The need for having more than one reactor in a reactor train may, for example, arise when an in-line blend component cannot be produced at the desired rate economically in a single reactor but there could be also reasons related to blend component quality, such as molecular weight or composition distribution, etc. Since a reactor train can comprise multiple reactors and/or reactor zones in series, the single blend component produced in a reactor train may itself be a polymer blend of polymeric components with varying molecular weights and/or compositions. However, in order to simplify the description of different embodiments of the processes disclosed herein, the polymeric product of a reactor train is referred to simply as blend component or polymeric blend component regardless of its molecular weight and/or compositional dispersion. For the purpose of defining the process of the present disclosure, parallel reactors will be considered as separate reactor trains even if they produce essentially the same in-line blend component. Also, spatially separated, parallel reaction zones that do not exchange or mix reaction mixtures by, for example, pump-around loops, or by other recirculation methods, will be considered as separate parallel reactor trains even when those parallel zones are present in a common shell and fall within the in-line blending process disclosed herein.

Reactor bank refers to the combination of all polymerization reactors in the polymerization section of the in-line polymer blending process disclosed herein. A reactor bank may comprise one or more reactor trains.

A parallel reactor configuration includes two or more reactors or reactor trains connected (also referred to as fluidly connected) in parallel. A reactor train, branch, or leg may include one reactor or alternatively more than one reactor configured in a series configuration. For example, a reactor train may include two, or three, or four, or more reactors in series. The entire parallel reactor configuration of the polymerization process disclosed herein, i.e., the combination of all parallel polymerization reactor trains forms the reactor bank.

Monomer recycle ratio refers to the ratio of the amount of recycled monomer fed to the reactor divided by the total (fresh plus recycled) amount of monomer fed to the reactor.

Polymerization system is defined to be the monomer(s) plus comonomer(s) plus polymer(s) plus optional inert solvent(s)/diluent(s) plus optional scavenger(s). Note that for the sake of convenience and clarity, the catalyst system is addressed separately in the present discussion from other components present in a polymerization reactor. In this regard, the polymerization system is defined here narrower than customary in the art of polymerization that typically considers the catalyst system as part of the polymerization system. In the current definition, the mixture present in the polymerization reactor and in its effluent is composed of the polymerization system plus the catalyst system.

A homogeneous polymerization system contains all of its components in a single phase dispersed and mixed on a molecular scale. In our discussions, homogeneous polymerization systems are meant to be in their dense fluid (liquid or supercritical) state. Note that our definition of the polymerization system does not include the catalyst system, thus the catalyst system may or may not be homogeneously dissolved in the polymerization system. A homogeneous system may have regions with concentration gradients, but there would be no sudden, discontinuous changes of composition on a micrometer scale within the system as it is the case when, for example, solid polymer-containing particles are suspended in a dense fluid. In practical terms, a homogeneous polymerization system has all of its components in a single dense fluid phase. Apparently, a polymerization system is not homogeneous when it is partitioned to more than one fluid phase or to a fluid and a solid phase. The homogeneous fluid state of the polymerization system is represented by the single fluid (liquid or supercritical fluid) region in its phase diagram.

Pure substances, including all types of hydrocarbons, can exist in either a subcritical, or supercritical state, depending on their temperature and pressure. To be in the supercritical state, a substance must have a temperature above its critical temperature (Tc) and a pressure above its critical pressure (Pc). Mixtures of hydrocarbons, including mixtures of monomers, polymers, and optionally inert solvents, have pseudo-critical temperatures (Tc) and pseudo-critical pressures (Pc), which for many systems can be approximated by mole-fraction-weighted averages of the corresponding critical properties (Tc or Pc) of the mixture's components. Mixtures with a temperature above their pseudo-critical temperature and a pressure above their pseudo-critical pressure will be said to be in a supercritical state or phase, and the thermodynamic behavior of supercritical mixtures will be analogous to supercritical pure substances. For purposes of this disclosure, the critical temperatures (Tc) and critical pressures (Pc) of certain pure substances relevant to the current disclosure are those that found in the HANDBOOK OF CHEMISTRY AND PHYSICS, David R. Lide, Editor-in-Chief, 82nd edition 2001-2002, CRC Press, LLC. New York, 2001. In particular, the Tc and Pc of selected substances are:

| Name | Tc (K.) | Pc (MPa) | Name | Tc (K.) | Pc (MPa) |
|------|---------|----------|------|---------|----------|
| Hexane | 507.6 | 3.025 | Propane | 369.8 | 4.248 |
| Isobutane | 407.8 | 3.64 | Toluene | 591.8 | 4.11 |

| Name | Tc (K.) | Pc (MPa) | Name | Tc (K.) | Pc (MPa) |
|---|---|---|---|---|---|
| Ethane | 305.3 | 4.872 | Methane | 190.56 | 4.599 |
| Cyclobutane | 460.0 | 4.98 | Butane | 425.12 | 3.796 |
| Cyclopentane | 511.7 | 4.51 | Ethylene | 282.34 | 5.041 |
| 1-butene | 419.5 | 4.02 | Propylene | 364.9 | 4.6 |
| 1-pentene | 464.8 | 3.56 | Cyclopentene | 506.5 | 4.8 |
| Pentane | 469.7 | 3.37 | Isopentane | 460.4 | 3.38 |
| Benzene | 562.05 | 4.895 | Cyclohexane | 553.8 | 4.08 |
| 1-hexene | 504.0 | 3.21 | Heptane | 540.2 | 2.74 |

273.2 K. = 0° C.

The following abbreviations are used: Me is methyl, Ph is phenyl, Et is ethyl, Pr is propyl, iPr is isopropyl, n-Pr is normal propyl, Bu is butyl, iBu is isobutyl, tBu is tertiary butyl, p-tBu is para-tertiary butyl, TMS is trimethylsilyl, TIBA is tri-isobutylaluminum, MAO is methylaluminoxane, pMe is para-methyl, flu is fluorenyl, cp is cyclopentadienyl.

By continuous is meant a system that operates (or is intended to operate) without interruption or cessation. For example, a continuous process to produce a polymer would be one where the reactants are continually introduced into one or more reactors and polymer product is continually withdrawn.

Slurry polymerization refers to a polymerization process in which particulate, solid polymer (e.g., granular) forms in a dense fluid or in a liquid/vapor polymerization medium. The dense fluid polymerization medium can form a single or two fluid phases, such as liquid, supercritical fluid, or liquid/liquid, or supercritical fluid/supercritical fluid, polymerization medium. In a liquid/vapor polymerization medium, the polymer resides in the liquid (dense) phase. Slurry polymerization processes typically employ heterogeneous catalyst particles, such as Ziegler-Natta catalysts or supported metallocene catalysts, and the like. The solid polymeric product typically adheres to the heterogeneous solid catalyst particles thus forming a slurry phase. Slurry polymerization processes operate below the solid-fluid phase transition temperature of the polymerization system.

Solution polymerization refers to a polymerization process in which the polymer is dissolved in a liquid polymerization system, such as an inert solvent or monomer(s) or their blends. Solution polymerization comprises a homogeneous liquid polymerization system in the reactor. The temperature of a liquid polymerization system is below of its supercritical or pseudo supercritical temperature, thus solution polymerizations are performed below the supercritical temperature and/or pressure. Conventional solution polymerization processes typically operate with more than 65 wt % inert solvent present in the polymerization system at pressures below 13 MPa (1885 psi) and temperatures between 40 and 160° C.

Advanced solution polymerization refers to a homogeneous solution polymerization process in which the reactor pressure is typically between 1.72-34.5 MPa (250-5,000 psi), the reactor temperature is between 50 and 160° C., solvent concentration in the liquid polymerization system is between 20 and 65 weight % (wt %). The solvent is typically a hydrocarbon or fluorohydrocarbon that is inert in polymerization. Advantageously, the solvent is a paraffinic hydrocarbon of 4-8 carbon atoms.

Supercritical polymerization refers to a polymerization process in which the polymerization system is in its dense supercritical or pseudo supercritical state, i.e. when the density of the polymerization system is above 300 g/L and its temperature and pressure are above the corresponding critical values.

Bulk polymerization refers to a polymerization process in which the dense fluid polymerization system contains less than 40 wt %, or less than 30 wt %, or less than 20 wt %, or less than 10 wt %, or less than 5 wt %, or less than 1 wt % of inert solvent. Inert solvents are characterized by their lack of incorporation into the product polymer chain. In the production of polyolefins, solvents are typically hydrocarbons comprising 4 to 20 carbon atoms, advantageously 5 to 10, or 5 to 8 carbon atoms. Note that the polymerization system may also contain inert diluents that do not incorporate into the product polymer chain. They are typically introduced as impurities present in the monomer feeds. For the purpose of the current disclosure, the inert diluents are considered separately from the inert solvents, the latter of which are added intentionally for their ability to keep the polymeric products in their dissolved state.

Homogeneous supercritical polymerization refers to a polymerization process in which the polymer is dissolved in a dense supercritical fluid polymerization medium, such as an inert solvent or monomer or their blends in their supercritical state. As described above, when the supercritical fluid polymerization system contains less than 40 wt %, or less than 30 wt %, or less than 20 wt %, or less than 10 wt %, or less than 5 wt %, or less than 1 wt % of inert solvent and the polymer is dissolved in the dense supercritical fluid, the process is referred to as a bulk homogeneous supercritical polymerization process. Homogeneous supercritical polymerization should be distinguished from heterogeneous supercritical polymerizations, such as for example, supercritical slurry processes, the latter of which are performed in supercritical fluids but form solid polymer particulates in the polymerization reactor. Similarly, bulk homogeneous supercritical polymerization should be distinguished from bulk solution polymerization, the latter of which is performed in a liquid as opposed to in a supercritical polymerization system.

Exemplary homogeneous polymerization processes are homogeneous supercritical (also referred to herein as supercritical), solution, or advanced solution polymerization processes.

DETAILED DESCRIPTION

Improved processes for monomer/solvent separation and recycle for supercritical, solution and advanced solution polymerization processes for propylene-containing polymers and their blends are provided. All numerical values within the detailed description and the claims herein are modified by "about" or "approximately" the indicated value, and take into account experimental error and variations that would be expected by a person having ordinary skill in the art.

The improved monomer separation and recycle processes disclosed herein may operate in conjunction with the advanced solution polymerization processes described in U.S. patent application Ser. No. 11/954,273 filed on Dec. 12, 2007, U.S. patent application Ser. No. 11/961,583 filed on Dec. 20, 2007, and U.S. patent application Ser. No. 12/016,346 filed on Jan. 18, 2008, each of which are herein incorporated by reference in their entirety.

The monomer separation and recycle processes disclosed herein may operate in conjunction with the solution polymerization processes and apparatus described in U.S. Pat. No. 7,163,989, herein incorporated by reference in its entirety.

The monomer/solvent separation and recycle processes disclosed herein may also operate in conjunction with the supercritical polymerization processes described in U.S. Pat. No. 7,279,536, herein incorporated by reference in its entirety.

The monomer/solvent separation and recycle processes disclosed herein may also operate in conjunction with the in-line blending processes described in U.S. Patent Application No. 60/905,247 filed on Mar. 6, 2007, and U.S. Patent Application No. 60/876,193 filed on Dec. 20, 2006, both of which are herein incorporated by reference in their entirety.

The disclosed monomer/solvent separation and recycle processes are advantageous when used in conjunction with bulk homogeneous supercritical (will also be referred to herein as supercritical) and advanced solution polymerization processes of propylene containing polymers because the provided benefits allow for the capture of one or more advantages associated with these processes, namely increased monomer concentration, improved product capability, and reduced cost of monomer and solvent recycle.

Some embodiments of the disclosed monomer separation and recycle processes achieve these benefits by introducing some or all of the heat to the reactor effluent stream via a heated internal recycle stream comprising the polymer-lean effluent from a gravimetric separator. More particularly, the heated internal recycle stream of the polymer-lean effluent from the gravimetric separator is pumped back and combined with the reactor effluent stream before the separator at either high pressure or low pressure. Enough heat must be provided to the combined polymer-lean effluent and reactor effluent stream to satisfy two requirements. The first requirement is that the lower critical solution temperature (also referred to LCST) boundary may be crossed in the combined polymer-lean effluent and reactor effluent stream before entering into the phase separator, such that a polymer-lean phase and a polymer-rich phase will form, phase separate, and exit the separator. The second requirement is that enough heat may be added to the combined polymer-lean effluent and reactor effluent stream such that the polymer-rich phase exiting the separator may still have enough heat (high-enough temperature) to remove/evaporate the residual solvent and monomer in the finishing stage of the process downstream of the gravimetric separator.

The one or more advantages provided by the disclosed monomer separation and recycle processes include, but are not limited to the following: (1) the polymer-lean effluent contains only low levels of polymer, such that it may not undergo phase separation upon heating, (2) the polymer-lean effluent generally has low viscosity, thus requiring minimal energy for pump around and also has better heat transfer properties, and (3) the heat exchanger required for heating the polymer-lean effluent can operate at reduced temperatures, thus reducing its investment and operating costs (4) the internal recycle of the polymer-lean phase dilutes the reactor effluent, thus reducing its viscosity and improving its heat transfer properties.

FIG. 1 depicts a process configuration of the prior art monomer separation and recycle process as described in U.S. Pat. No. 7,163,989. Referring to FIG. 1, solvents, catalysts and monomers are fed to the homogeneous polymerization reactor via high-pressure feed pumps and feed chillers. Polymer is then formed in solution in the reactor. Note that disclosed processes may use more than one reactor connected in series or in parallel. The high-pressure reactor effluent stream exiting the reactor is then fed to the cement heater, also referred to as a heat exchanger. In the heat exchanger, heat is added to the reactor effluent stream, such that a single phase is present throughout the heat exchanger. In case more than one parallel reactor train is deployed in the polymerization reactor bank, the reactor effluents are typically combined before the cement heater. However, they may also be heated individually before they are combined.

The pressure of the heated high-pressure reactor effluent stream from the cement heater is then reduced across a pressure let-down valve to provide for a low-pressure reactor effluent fed to a downstream phase separator. The cloud point boundary is crossed through the pressure let-down step, such that two phases, a polymer-lean phase and a polymer-rich phase, are formed. The two phases are separated in the downstream Lower Critical Solution Temperature separator, also referred to as a "LCST" or a "gravimetric separator" or simply as a "separator" by letting the higher-density polymer-rich phase settle to the bottom and the lower-density polymer-lean phase float to the top. The polymer-rich phase exits the bottom of the separator after which it may be subjected to further processing steps to remove the remaining solvent and monomer. The polymer-lean phase exits the top of the separator where it may be recycled back to the reactor as shown in FIG. 1. The polymer-lean phase from the separator is typically treated by a recycle treatment step to remove certain components, such as trace water, hydrogen, and inert components, for example propane, prior to being recycled to the reactor. The polymer-lean phase from the gravimetric separator is pumped up to the reactor pressure via a high-pressure recycle pump before being introduced into the reactor.

Sufficient heat may be added in the heat exchanger for the reactor effluent stream, such that the polymer-rich phase from the separator will be hot enough to stay molten through the rest of the processing steps, but not so hot as to cross the cloud point boundary within the heat exchanger. If two phases (polymer-rich phase and polymer-lean phase) are formed in the heat exchanger due to overheating, then fouling of the heat exchanger heating surfaces may occur due to the polymer-rich phase. The prior art separation scheme depicted in FIG. 1 has limitations on the monomer concentration. Namely, as the solvent concentration is reduced (or monomer concentration increased), at some point the amount of heat that can be supplied in the heat exchanger to the reactor effluent stream without fouling is not sufficient to maintain the polymer molten through the remaining downstream processing steps for recovering the polymeric product in with the desired low concentration of volatile organic compounds (VOCs). These VOCs are typically released into the environment during processing the polymers into articles of use. Since these pollutants contribute to ground-level ozone, their concentration in the product polymer may need to be reduced to a low level. For that purpose, the downstream processing steps of the polymer-rich phase from the gravimetric separator typically involve further solvent and monomer removal through the use of one or more low pressure separators and extrusion.

Figure 2:
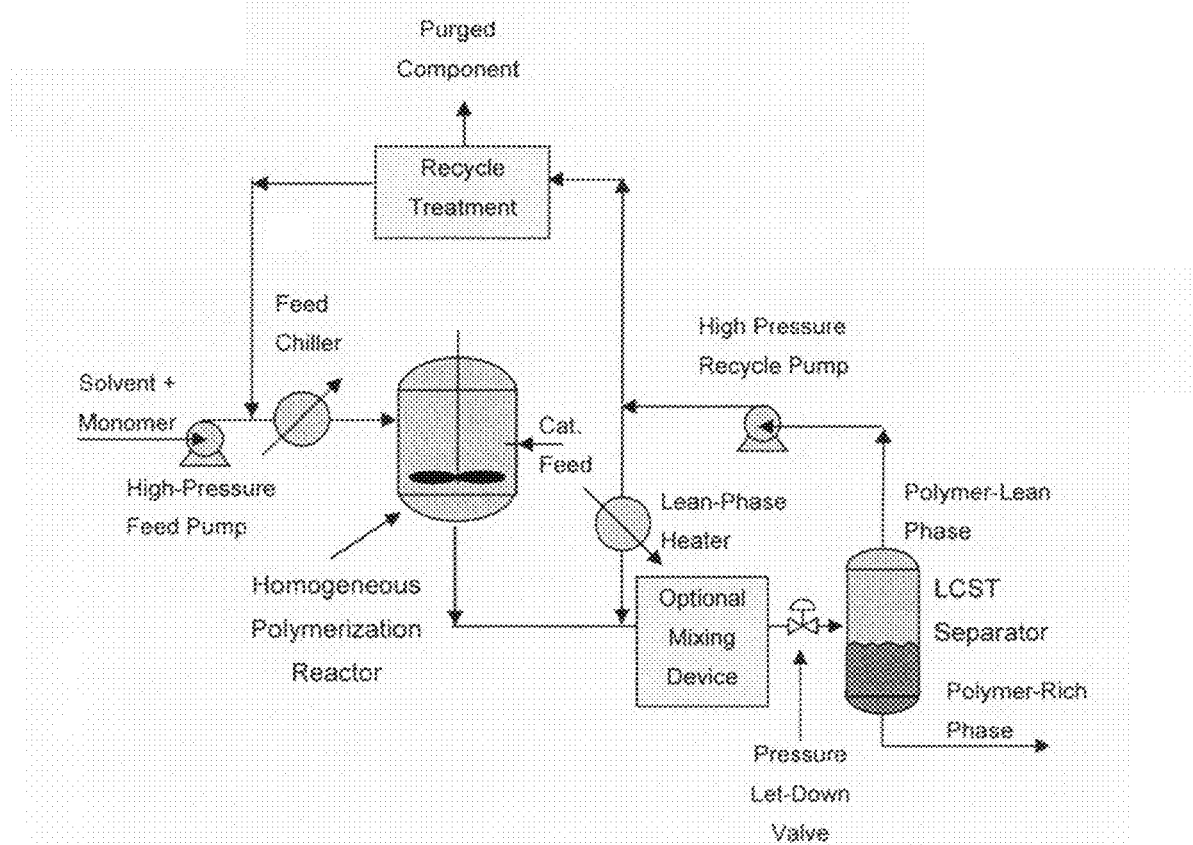
FIG. 2 depicts an exemplary schematic of the disclosed monomer/solvent separation and recycle, wherein the polymer-lean recycle stream and reactor effluent stream are combined at high pressure and heat is added to the high-pressure polymer-lean recycle stream prior to combining it with the high-pressure reactor effluent stream.

Exemplary Process Embodiments and Flow Diagrams:

One exemplary embodiment of the improved monomer/solvent separation and recycle processes disclosed herein as depicted in FIG. 2. In this embodiment, the heat necessary for achieving phase separation upstream of the phase separator and for the removal of the solvent and monomer remnants from the product downstream of the phase separator is provided by heating a polymer-lean recycle stream from the phase separator and combining this heated polymer-lean recycle stream with the rector effluent. Note that the single reactor depicted in FIG. 2 may also optionally be two or more series connected reactors, or two or more parallel reactors, or a combination of series and parallel reactors together forming a reactor bank. Referring to FIG. 2, the homogeneous (solution, or advanced solution or supercritical) polymerization reactor yields a high-pressure reactor effluent stream. For the case of two or more parallel reactors, two or more reactor effluent streams may be produced by the reactors. These reactor effluent streams when polymerizing olefin-based monomers and comonomers are at high pressure. High pressure is defined as greater than or equal to 1.7 MPa (250 psi), or greater than or equal to 10 MPa (1450 psi), or greater than or equal to 11.7 MPa (1700 psi), or greater than or equal to 13.8 MPa (2000 psi), or greater than or equal to 17.2 MPa (2500 psi), or greater than or equal to 20.7 MPa (3000 psi), or greater than or equal to 24.1 MPa (3500 psi), or greater than or equal to 27.6 MPa (4000 psi). High pressure is generally defined to be in the range of 1.7 to 207 MPa (250 to 30,000 psi). In the context of the current disclosure, high-pressure differentiates the reactor pressure from the low pressures that exist in the phase separator and the process steps downstream of the separator. Consequently, pressure ranges may qualify as high or low pressure, depending on the particular embodiment. For example, in a supercritical polymerization process that may operate at 100 MPa, the high pressure is defined as 100 MPa, while the low pressure existing in the phase separator may mean 13.8 MPa. On the other hand, in a solution polymerization process operating at 11.7 MPa, the high pressure, 11.7 MPa, is lower than the low pressure of 13.8 MPa in the supercritical process. Importantly, however, the disclosed processes can be broken into a well-defined high-pressure section and a low-pressure section. In the disclosed processes, the polymerization reactors typically operate in the high-pressure section, while the phase separator and equipment downstream of the phase separator typically operate in the low-pressure section.

The temperature of the reactor effluent stream may range from 40° C. to 180° C., or from 50° C. to 160° C., or from 50° C. to 150° C. when polymerizing olefin monomers. The pressure and temperature of the medium comprising the reactor effluent and present in the phase separator are typically selected such that the said medium forms two fluid phases, while the pressure and temperature of the polymerization system in the reactor are selected such that the polymerization system forms a single dense fluid phase.

A gravimetric separator is located downstream of the polymerization reactor and is fluidly connected to the reactor effluent stream(s). A polymer-lean phase stream from the gravimetric separator is pumped up or pressurized to high pressure, such as the reactor pressure, via a high-pressure recycle pump to form a high-pressure polymer-lean recycle stream. The high-pressure polymer-lean recycle stream is then split into two high-pressure polymer-lean recycle streams via a tee in the process piping and a flow control means (e.g. flow control valve) to control the relative flow rate of the two recycle streams. One high-pressure polymer-lean recycle stream may be optionally recycled back to the polymerization reactor(s). The other high-pressure polymer-lean recycle stream is first heated and then recycled back to combine with the reactor effluent stream. More particularly, one of the two high-pressure polymer-lean recycle streams may be heated in a lean-phase heater or heat exchanger to form a heated high-pressure polymer-lean recycle stream prior to being combined with the reactor effluent stream. The heated high-pressure polymer-lean recycle stream is generally heated to a temperature greater than or equal to 140° C., or greater than or equal to 160° C., or greater than or equal to 180° C., or greater than or equal to 200° C. Generally, the maximum temperature of the heated high-pressure polymer-lean recycle stream is 220° C.

The heated high-pressure polymer-lean recycle stream containing predominately solvent and monomer is then combined with the one or more high-pressure reactor effluent streams to form a heated high-pressure reactor effluent mixed stream. These two streams are combined after the reactors and before a downstream pressure let-down valve. The temperature of the heated high-pressure reactor effluent mixed stream needs to be high enough to provide for the heat of volatile organic compounds removal from the polymer-rich effluent drawn from the bottom of the phase separator and may range from 120° C. to 200° C., or from 120° C. to 180° C., or from 140° C. to 200° C. when polymerizing olefin monomers.

The heated high-pressure reactor effluent mixed stream may then be optionally passed through a mixing device, such as a static mixer or a mechanical agitation device, in order to improve the mixing between the polymer-lean recycle stream and the reactor effluent stream. The heated high-pressure reactor effluent mixed stream then is passed through a pressure let-down valve to form a heated low-pressure reactor effluent mixed stream. When passing the heated high-pressure reactor effluent mixed stream through the pressure let-down valve, the pressure is reduced to pass the lower critical solution temperature (LCST) phase boundary. The pressure of the heated low-pressure reactor effluent mixed stream may be dropped through the pressure let-down valve at a rate of at least 6 MPa/sec, or 4 MPa/sec, or 2 MPa/sec.

The heated low-pressure reactor effluent mixed stream exiting the pressure let-down valve then passes into a gravimetric separator to separate a polymer-lean phase flowing from the top of the separator from a polymer-rich phase flowing from the bottom of the separator. The polymer-lean phase flowing from the top of the separator becomes the polymer-lean recycle stream as previously described. The polymer-rich phase flowing from the bottom of the separator then becomes the polymer-rich stream. The polymer-rich stream then proceeds for further processing (not shown in FIG. 2) as will be described below to yield the polymer product, typically in a solid pellet form, which may then be used in polymer processing producing end-use articles. The polymer-lean recycle stream from the separator may then be pressurized, split and a portion of the split stream heated for combining with the reactor effluent stream as previously described. In the form of the monomer/solvent separation and recycle processes depicted in FIG. 2 and described above, fouling of the heat exchanger may not be an issue because there are no heating surfaces (i.e. cement heater/heat exchanger) to foul after combining the heated high-pressure polymer-lean recycle stream and the high pressure reactor effluent stream(s).

In an alternative form of the process depicted in FIG. 2, the one or more high-pressure reactor effluent streams may be partially heated in a cement heater/heat exchanger (not shown in FIG. 2) to form a heated high-pressure reactor effluent stream before being combined with the heated high-pressure polymer-lean recycle stream. The exit temperature of the reactor effluent heater is advantageously maintained below the LCST. The rest of the heat required for achieving the desired low VOC contents in the final product may be brought in by a higher-temperature heated high-pressure polymer-lean recycle stream. This option decreases the heating load required for the heated high-pressure polymer-lean recycle stream and still provides for no or minimal fouling because there are no heating surfaces (i.e. cement heater/heat exchanger) to foul after combining the heated high-pressure polymer-lean recycle stream and the high-pressure reactor effluent stream to form the heated high-pressure reactor effluent mixed stream.

In yet another alternative form of FIG. 2, the heated high-pressure reactor effluent mixed stream may be further heated in a cement heater/heat exchanger (not shown in FIG. 2) after the combination point, but before the optional downstream mixing device and the downstream pressure let-down valve. Although this option decreases the heating load required for the heated high-pressure polymer-lean recycle stream, it is less desirable because of the increased propensity for fouling at the heating surfaces (in the cement heater/heat exchanger) after combining the heated high-pressure polymer-lean recycle stream and the reactor effluent stream to form the heated high-pressure reactor effluent mixed stream.

Figure 3:
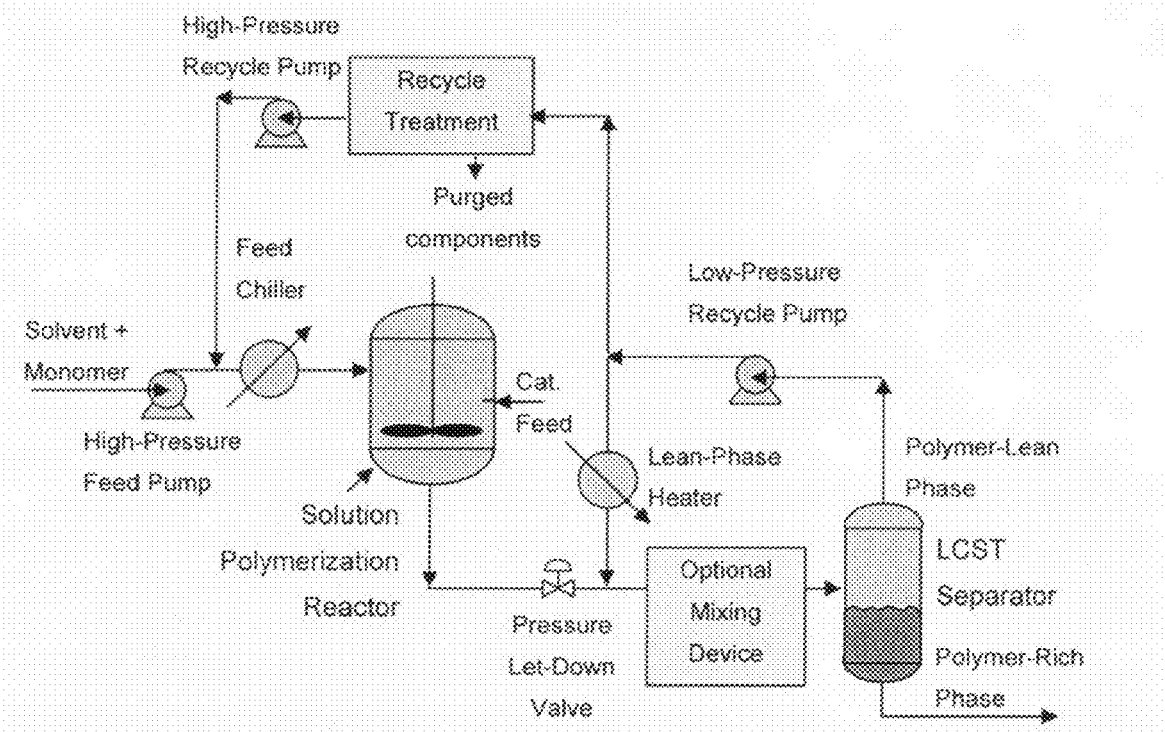
FIG. 3 depicts an alternative exemplary schematic of the disclosed monomer/solvent separation and recycle, wherein the polymer-lean recycle stream and reactor effluent stream are combined at low pressure and heat is added to the low-pressure polymer-lean recycle stream prior to combining it with the low-pressure reactor effluent stream.

In another exemplary embodiment of the improved monomer/solvent separation and recycle processes disclosed herein as shown in FIG. 3, the reactor effluent stream heat exchanger is again eliminated, but the contacting of the heated polymer-lean recycle stream with the reactor effluent stream occurs downstream of the pressure let-down valve, and hence at a low pressure. Referring to FIG. 3, an optional low-pressure recycle pump may be used to pump the polymer-lean stream from the gravimetric separator to form a low-pressure polymer-lean recycle stream. In this embodiment, the low-pressure pump needs only to overcome the hydraulic resistance in the recycle loop, but does not need to raise the pressure of the polymer-lean recycle stream to the reactor pressure, and thus requires less power than the recycle pump deployed in the embodiment represented in FIG. 2 above. The low-pressure polymer-lean recycle stream is then split into two low-pressure polymer-lean recycle streams via a tee in the process piping and a flow control means (e.g. flow control valve) to control the relative flow rate of the two recycle streams. One low-pressure polymer-lean recycle stream may be optionally recycled back to the polymerization reactor(s) after passing through an optional recycle treatment to remove impurities and then a high pressure recycle pump. The other low-pressure polymer-lean recycle stream is recycled back to the reactor effluent stream after being heated. More particularly, one of the two low-pressure polymer-lean recycle streams may be heated in a lean-phase heater or heat exchanger to form a heated low-pressure polymer-lean recycle stream prior to being combined with the reactor effluent stream. The heated low-pressure polymer-lean recycle stream is generally heated to a temperature greater than or equal to 140° C., or greater than or equal to 160° C., or greater than or equal to 180° C., or greater than or equal to 200° C. Generally, the maximum temperature of the heated low-pressure polymer-lean recycle stream is 220° C. The maximum temperature of the low-pressure polymer-lean recycle stream in this embodiment may be lower than that applicable in the embodiment depicted in FIG. 2 due to reaching or exceeding the bubble point of the low-pressure polymer-lean recycle stream, which is undesirable.

The high-pressure reactor effluent stream(s) is brought to lower pressure by passing through a pressure let-down valve to form a low pressure reactor effluent stream. When passing the reactor effluent stream through the pressure let-down valve, the pressure is reduced to pass the lower critical solution temperature phase boundary of the low-pressure mixed reactor effluent stream formed by mixing the low-pressure reactor effluent and the heated low-pressure polymer-lean recycle streams. Note that the low-pressure reactor effluent may or may not cross the LCST boundary before mixing it with the heated polymer-lean recycle stream. In some instances, the phase separation may only occur after mixing the low-pressure heated polymer-lean recycle stream with the low-pressure reactor effluent.

The heated low-pressure polymer-lean recycle stream containing predominately solvent and monomer is then combined with the low pressure reactor effluent streams from the reactor(s) to form a heated low-pressure reactor effluent mixed stream. In this form, generally the heated low-pressure reactor effluent mixed stream will not form a single phase, but will be present as two phases after combining the two streams, i.e., the pressure and temperature of the heated low-pressure reactor effluent mixed stream is set to ensure that the stream separates into two dense fluid phases. The temperature of the heated low-pressure reactor effluent mixed stream needs to be high enough to provide for the heat of volatile organic compounds removal from the polymer-rich effluent drawn from the bottom of the phase separator and may range from 120° C. to 200° C., or from 120° C. to 180° C., or from 140° C. to 200° C. when polymerizing olefin monomers.

The heated low-pressure reactor effluent mixed stream then passes into a gravimetric separator to separate a polymer-lean phase flowing from the top of the separator from a polymer-rich phase flowing from the bottom of the separator. The polymer-lean phase flowing from the top of the separator becomes the polymer-lean recycle stream as previously described. The polymer-rich phase flowing from the bottom of the separator then becomes the polymer-rich stream. The polymer-rich stream then proceeds for further processing (not shown in FIG. 3) as will be described below to yield the final polymer product. The polymer-lean recycle stream from the separator may then be split and a portion of the split stream heated for combining with the reactor effluent stream as previously described. In the form of the monomer/solvent separation and recycle processes depicted in FIG. 3 and described above, fouling may not be an issue because there are no heating surfaces (i.e. cement heater/heat exchanger) to foul after combining the heated low-pressure polymer-lean recycle stream and the low pressure reactor effluent stream(s).

In an alternative form of the process depicted in FIG. 3, the one or more high-pressure reactor effluent streams may be partially heated in a cement heater/heat exchanger (not shown in FIG. 3) to form a heated high-pressure reactor effluent stream before being passed through the pressure let-down valve. The heat added to the reactor effluent is augmented by the heat added in a separate heat exchanger to the low-pressure polymer-lean recycle stream. This option decreases the heating load required for the heated low-pressure polymer-lean recycle stream and still provides for no or minimal fouling because there are no heating surfaces (i.e. cement heater/heat exchanger) to foul after combining the heated low-pressure polymer-lean recycle stream and the heated low-pressure reactor effluent stream to form the heated low-pressure reactor effluent mixed stream.

The disadvantage of this low-pressure combining embodiment (FIG. 3) relative to the high-pressure combining embodiment (FIG. 2) is that the amount of heat that can be added to the low-pressure polymer-lean recycle stream may be limited by vaporization of the low-pressure polymer-lean recycle fluid, particularly in the embodiments operating with in the lower-pressure solution and advanced solution processes. It typically is not an issue in the supercritical processes. Generally, more heat may be added to a high-pressure polymer-lean recycle stream and avoid vaporization of the fluid.

Figure 4:
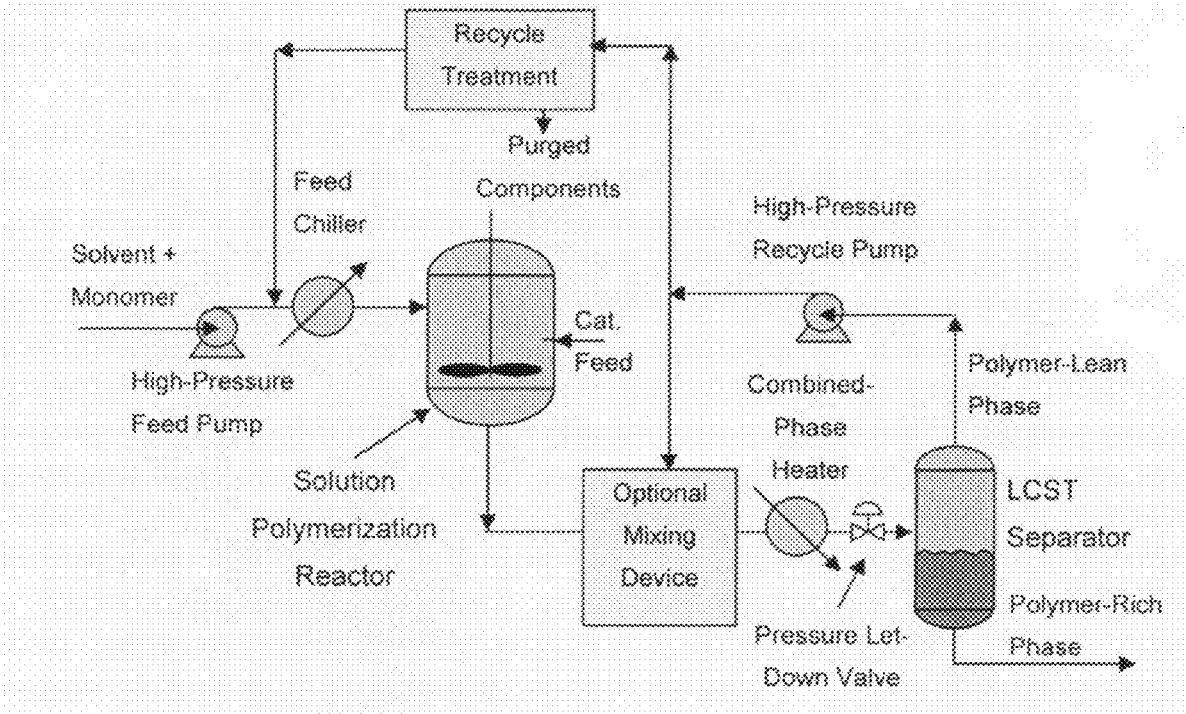
FIG. 4 depicts an alternative exemplary schematic of the disclosed monomer/solvent separation and recycle, wherein the combined polymer-lean high-pressure recycle stream and high-pressure reactor effluent stream are heated before pressure let-down.

In another exemplary embodiment of the improved monomer/solvent separation and recycle processes disclosed herein (depicted in FIG. 4), the polymer-lean recycle stream is not heated prior to combining it with the reactor effluent. Instead, the heating occurs after the high-pressure reactor effluent stream and the high-pressure polymer-lean recycle stream are combined. The single reactor depicted in FIG. 4 may also optionally be two or more series reactors, or two or more parallel reactors, or a combination of series and parallel reactors. Referring to FIG. 4, the solution, or advanced solution or super-critical polymerization reactor yields a high-pressure reactor effluent stream. For the case of two or more parallel reactors, two or more reactor effluent streams may be produced by the reactors.

A gravimetric separator is located downstream of the polymerization reactor and is fluidly connected to the reactor effluent stream(s). The gravimetric separator produces a low-pressure polymer-lean recycle phase primarily composed of monomer and in most instances solvent (solvent is essentially absent in bulk solution and bulk homogeneous supercritical polymerization processes) and a polymer-rich stream, the latter of which may be further processed to obtain the final polymeric product typically in the form of solid pellets. The low-pressure polymer-lean phase stream from the gravimetric separator may be pumped up or pressurized to high pressure, such as the reactor pressure, via a high-pressure recycle pump to form a high-pressure polymer-lean recycle stream. The high-pressure polymer-lean recycle stream is then split into two high-pressure polymer-lean recycle streams via a tee in the process piping and a flow control means (e.g. flow control valve) to control the relative flow rate of the two recycle streams. One high-pressure polymer-lean recycle stream may be optionally recycled back to the one or more polymerization reactors. The other high-pressure polymer-lean recycle stream may be combined with the reactor effluent stream without being heated. More particularly, the high-pressure polymer-lean recycle stream containing predominately solvent and monomer is then combined with the one or more high-pressure reactor effluent streams from the reactor(s) to form a high-pressure reactor effluent mixed stream. These two streams are combined after the reactors and before a downstream heat exchanger and pressure let-down valve. The high-pressure reactor effluent mixed stream may then be optionally passed through a mixing device, such as a static mixer or a mechanical agitation device, in order to improve the mixing between the polymer-lean recycle stream and the reactor effluent stream.

The high-pressure reactor effluent mixed stream may be heated in a cement heater/heat exchanger after the combination point, but before the downstream pressure let-down valve in order to increase the temperature of the stream to form a heated high-pressure reactor effluent mixed stream. The temperature of the heated high-pressure reactor effluent mixed stream needs to be high enough to provide for the heat of volatile organic compounds removal from the polymer-rich effluent drawn from the bottom of the phase separator, and may range from 120° C. to 200° C., or from 120° C. to 180° C., or from 140° C. to 200° C. when polymerizing olefin monomers. The presence of the high-pressure polymer-lean recycle stream allows for more heat to be added to the heated high-pressure reactor effluent mixed stream while avoiding fouling in the heat exchanger.

The heated high-pressure reactor effluent mixed stream then is passed through a pressure let-down valve to form a heated low-pressure reactor effluent mixed stream. When passing the heated high-pressure reactor effluent mixed stream through the pressure let-down valve, the pressure is reduced to pass the lower critical solution temperature phase boundary. The pressure of the heated low-pressure reactor effluent mixed stream may be dropped at a rate of at least 6 MPa/sec, or 4 MPa/sec, or 2 MPa/sec through the pressure let-down valve.

The heated low-pressure reactor effluent mixed stream exiting the pressure let-down valve then passes into a gravimetric separator to separate a polymer-lean phase flowing from the top of the separator from a polymer-rich phase flowing from the bottom of the separator. The polymer-lean phase flowing from the top of the separator becomes the polymer-lean recycle stream as previously described. The polymer-rich phase flowing from the bottom of the separator then becomes the polymer-rich stream. The polymer-rich stream then proceeds for further processing (not shown in FIG. 4) as will be described below to yield the final polymer product. The polymer-lean recycle stream from the separator may then be pressurized for combining with the reactor effluent stream as previously described.

In an alternative form of FIG. 4, the one or more high-pressure reactor effluent streams may be partially heated in a cement heater/heat exchanger (not shown in FIG. 4) to form a heated high-pressure reactor effluent stream before being combined with the high-pressure polymer-lean recycle stream. The temperature of the heated high-pressure reactor effluent stream may be maintained below the LCST in order to avoid fouling in the cement heater. This option decreases the heating load required by downstream cement heater/heat exchanger after combining the high-pressure reactor effluent stream and the high-pressure polymer-lean recycle stream.

Polymerization Process:

The upstream polymerization process may be a solution process, an advanced solution process or a supercritical process. In some embodiments, at least one of the monomers or comonomers utilized is propylene. There may be a single polymerization reactor, or two or more series reactors, or two or more parallel reactors or a combination of series and parallel reactors for producing the reactor effluent stream(s). When two or more parallel reactor trains are utilized, the downstream gravimetric separator may also act as a blender for blending the combined reactor effluent streams to produce a blended polymer-rich phase. In addition to propylene monomer, any other monomer having one or more (non-conjugated) aliphatic double bond(s) and two or more carbon atoms can be used. Exemplary monomers include ethylene, propylene, and α-olefins, such as butene-1, hexene-1, octene-1, and decene-1, substituted olefins, such as styrene, param-ethylstyrene, vinylcyclohexane, etc., non-conjugated dienes, such as vinylcyclohexene, etc., α,ω-dienes, such as 1,5-hexadiene, 1,7-octadiene, etc., cycloolefins, such as cyclopentene, cyclohexene, cyclohexadiene, etc., norbornene, and the like.

Any polymerization catalyst capable of polymerizing the monomers disclosed can be used if the catalyst is sufficiently active under the polymerization conditions disclosed herein. Thus, Group-3-10 transition metals can form suitable polymerization catalysts. A suitable olefin polymerization catalyst will be able to coordinate to, or otherwise associate with, an alkenyl unsaturation. Illustrative, but not limiting, olefin polymerization catalysts include Ziegler-Natta catalyst compounds, metallocene catalyst compounds and other non-metallocene catalyst compounds. Particularly useful metallocene catalyst and non-metallocene catalyst compounds (such as nonmetallocene metal-centered, heteroaryl ligand catalyst compounds) are those disclosed in paragraphs [0081] to [0111] of U.S. Ser. No. 10/667585 and paragraphs [0173] to [0293] of U.S. Ser. No. 11/177004, the paragraphs of which are fully incorporated herein by reference. Nonmetallocene metal-centered, heteroaryl ligand catalyst compounds are described in detail in PCT Patent Publications Nos. WO 02/38628, WO 03/040095 (pages 21 to 51), WO 03/040201 (pages 31 to 65), WO 03/040233 (pages 23 to 52), WO 03/040442 (pages 21 to 54), WO 2006/38628, and U.S. patent application Ser. No. 11/714,546, each of which is herein incorporated by reference.

The catalyst compounds described herein are combined with activators for use herein. An activator is defined as any combination of reagents that increases the rate at which a metal complex polymerizes unsaturated monomers, such as olefins. An activator can also affect the molecular weight, degree of branching, comonomer content, or other properties of the polymer. Non-limiting exemplary classes of activators include aluminoxane and aluminum alkyl activators, ionizing activators, non-ionizing activators.

The catalyst compounds described herein include a support material or carrier. For example, the one or more catalyst components and/or one or more activators can be deposited on, contacted with, vaporized with, bonded to, or incorporated within, adsorbed or absorbed in, or on, one or more supports or carriers.

The support material is any of the conventional support materials. Preferably, the supported material is a porous support material, for example, talc, inorganic oxides and inorganic chlorides. Other support materials include resinous support materials such as polystyrene, functionalized or cross-linked organic supports, such as polystyrene divinyl benzene polyolefins or polymeric compounds, zeolites, clays, or any other organic or inorganic support material and the like, or mixtures thereof.

Compounds that destroy impurities without destroying the catalyst are referred to as scavengers by one skilled in the art of polymerization. Impurities can harm catalysts by reducing their activity. Scavengers can be optionally fed to the reactor(s) of the process disclosed herein. Catalytic activity can be defined many different ways. For example, catalytic activity can be expressed as turnover frequency, i.e., the number of moles of monomers converted to the product in a unit time by one mole of catalyst. For a given reactor operating at the same residence time, catalytic activity can also be measured in terms of catalyst productivity, customarily expressed as the weight of polymer made by a unit weight of catalyst.

The scavengers for use in the processes disclosed herein can be different chemical compound(s) from the catalyst activator. Non-limiting exemplary scavengers include alkyl aluminum compounds, such as trimethyl aluminum, triethyl aluminum, tri-isobutyl aluminum, and trioctyl aluminum. The scavenger can also be the same as the catalyst activator and is generally applied in excess of what is needed to fully activate the catalyst. These scavengers include, but are not limited to, aluminoxanes, such as methyl aluminoxane. The scavenger can also be introduced to the reactor with the monomer feed or with any other feed stream. In one particular embodiment, the scavenger is introduced with the monomer-containing feed. The scavenger can be homogeneously dissolved in the polymerization polymerization system or can form a separate solid phase. In one particular embodiment, scavengers are dissolved in the polymerization system.

With regard to the polymerization system, diluents and solvents are those that are soluble in and inert to the monomer and any other polymerization components at the polymerization temperatures and pressures used. Exemplary solvents/diluents for use in the disclosure include one or more of $C_2$-$C_{24}$ alkanes, more particularly propane, n-butane, i-butane, n-pentane, i-pentane, n-hexane, mixed hexanes, cyclopentane, cyclohexane, etc., single-ring aromatics, such as toluene and xylenes. In some embodiments, the diluent comprises one or more of ethane, propane, butane, isobutane, isopentane, hexanes, and octanes. In some embodiments, the diluent is recyclable.

Exemplary diluents also include $C_4$ to $C_{150}$ isoparaffins, or $C_4$ to $C_{100}$ isoparaffins, or $C_4$ to $C_{25}$ isoparaffins, or $C_4$ to $C_{20}$ isoparaffins. By isoparaffin is meant that the paraffin chains possess $C_1$ to $C_{10}$ alkyl branching along at least a portion of each paraffin chain. More particularly, the isoparaffins are saturated aliphatic hydrocarbons whose molecules have at least one carbon atom bonded to at least three other carbon atoms or at least one side chain (i.e., a molecule having one or more tertiary or quaternary carbon atoms), and preferably wherein the total number of carbon atoms per molecule is in the range between 6 to 50, and between 10 and 24 in another embodiment, and from 10 to 15 in yet another embodiment. Various isomers of each carbon number will typically be present. The isoparaffins can also include cycloparaffins with branched side chains, generally as a minor component of the isoparaffin. Preferably, the density (ASTM 4052, 15.6/15.6° C.) of these isoparaffins ranges from 0.65 to 0.83 g/cm$^3$; the pour point is −40° C. or less, preferably −50° C. or less, the viscosity (ASTM 445, 25° C.) is from 0.5 to 20 cSt at 25° C.; and the average molecular weights in the range of 100 to 300 g/mol.

As previously described, one or more reactors in series or in parallel, or a combination of series and parallel reactors may be used to produce one or more reactor effluent streams. The catalyst compound and activator can be delivered as a solution or slurry, either separately to the reactor, activated in-line just prior to the reactor, or preactivated and pumped as an activated solution or slurry to the reactor. An exemplary operation is two solutions activated in-line. Polymerizations are carried out in either single reactor operation, in which monomer, comonomers, catalyst/activator, scavenger, and optional modifiers are added continuously to a single reactor or in series reactor operation, in which the above components are added to each of two or more reactors connected in series. The catalyst components can be added to the first reactor in the series. The catalyst component can also be added to both reactors, with one component being added to first reaction and another component to other reactors.

In one or more embodiments, polymerization can occur in high-pressure reactors where, preferably, the reactor is substantially inert to the polymerization reaction components and is able to withstand the high pressures and temperatures that occur during the polymerization reaction. Such reactors are known as high-pressure reactors for purposes of this disclosure. Withstanding these high pressures and temperatures will allow the reactor to maintain the polymerization system in its homogeneous condition. Suitable reaction vessels include those known in the art to maintain high-pressure polymerization reactions. Suitable reactors are selected from autoclave, pump-around loop or autoclave, tubular, and autoclave/tubular reactors, among others.

Autoclave reactors can be operated in batch or continuous mode. To provide better productivity, and thus to lower production cost, continuous operation is beneficial in commercial operations. Tubular reactors operate in a continuous mode. Typically, autoclave reactors have length-to-diameter ratios of 1:1 to 20:1 and are fitted with a high-speed (up to 2000 RPM) multiblade stirrer. Commercial autoclave pressures are typically greater than 5 MPa with a maximum of typically less than 20 MPa. The maximum pressure of commercial autoclaves, however, can increase with advances in mechanical engineering and material science. When the autoclave has a low length-to-diameter ratio (such as less than four), the feed streams are typically injected at only one position along the length of the reactor. Reactors with large length-to-diameter ratios can have multiple injection ports at nearly the same position along the length of the reactor but radially distributed to allow for faster intermixing of the feed components with the polymerization system. In the case of stirred tank reactors, the separate introduction of the catalyst is possible. Such introduction prevents the possible formation of hot spots in the unstirred feed zone between the mixing point and the stirred zone of the reactor. Injections at two or more positions along the length of the reactor are also possible. For instance, in reactors where the length-to-diameter ratio is around 4-20, the reactor preferably can contain up to six different injection positions. Additionally, in the larger autoclaves, one or more lateral fixing devices support the high-speed stirrer. These fixing devices can also divide the autoclave into two or more zones. Mixing blades on the stirrer can differ from zone to zone to allow for a different degree of plug flow and back mixing, largely independently, in the separate zones. Two or more autoclaves with one or more zones can connect in series cascade to increase residence time or to tailor polymer structure. A series reactor cascade consists of two or more reactors connected in series, in which the effluent of at least one upstream reactor is fed to the next reactor downstream in the cascade. Besides the effluent of the upstream reactor(s), the feed of any reactor in the series cascade can be augmented with any combination of additional monomer, catalyst, or solvent fresh or recycled feed streams. Two or more reactors can also be arranged in a parallel configuration. The individual arms of such parallel arrangements are called reactor trains. These reactor trains in turn can themselves comprise one reactor or a reactor series cascade creating a combination of series and parallel reactors.

Tubular reactors are also well suited for use in various embodiments of the invention, more particularly tubular reactors capable of operating up to 300 MPa. Tubular reactors are fitted with external cooling and one or more injection points along the (tubular) reaction zone. As in autoclaves, these injection points serve as entry points for monomers (such as propylene), one or more comonomer, catalyst, or mixtures of these. In tubular reactors, external cooling allows for increased monomer conversion relative to an autoclave, where the low surface-to-volume ratio hinders any significant heat removal. Tubular reactors have a special outlet valve that can send a pressure shockwave backward along the tube. The shockwave helps dislodge any polymer residue that has formed on reactor walls during operation. Another way of addressing wall deposits is to fabricate the tube with smooth, unpolished internal surfaces. Tubular reactors can operate at pressures up to 300 MPa and preferably have lengths of 100-2500 meters and internal diameters usually less than 10 cm thus sometimes have length/diameter ratios over 20,000.

Reactor trains that pair autoclaves with tubular reactors can also serve in embodiments of the invention. In such instances, the autoclave typically precedes the tubular reactor or the two types of reactors form separate trains of a parallel reactor configuration. Such systems can have injection of additional catalyst and/or feed components at several points in the autoclave and more particularly along the tube length.

In both autoclaves and tubular reactors, at injection, feeds are preferably cooled to near ambient temperature or below to provide maximum cooling and thus maximum polymer production within the limits of maximum operating temperature. In autoclave operation, a preheater operates at startup, but not after the reaction reaches steady state if the first mixing zone has some back-mixing characteristics. In tubular reactors, the first section of double-jacketed tubing is heated rather than cooled and is operated continuously. A well-designed tubular reactor is characterized as plug flow. Plug flow is a flow pattern with minimal radial flow rate differences. In both multizone autoclaves and tubular reactors, catalyst can be injected at the inlet, and optionally at one or more points along the reactor. The catalyst feeds injected at the inlet and other injection points can be the same or different in terms of content, density, concentration, etc. Choosing different catalyst feeds allows polymer design tailoring. At the reactor outlet valve, the pressure drops to levels below that which critical phase separation occurs. Therefore, the downstream separation vessel contains a polymer-rich phase and a polymer-lean phase. The autoclave or tubular reactor effluent is depressurized on entering the high pressure separator (HPS). In polymerizations based on propylene, alternative choices are open to the design relative to classic high pressure polyethylene process technology.

At the reactor outlet valve, the pressure drops to begin the separation of polymer and unreacted monomer, co-monomers, inerts, like ethane, propane, solvents, like hexanes, toluene, etc. The temperature in this vessel should be maintained above the polymer product's crystallization point but the pressure can be below the critical point, if a critical point can be determined. The pressure need only be high enough that the propylene can be condensed against standard cooling water. The liquid recycle stream can then be recycled to the reactor with a liquid pumping system instead of the hypercompressors required for polyethylene units. The relatively low pressure in this separator will reduce the monomer concentration in the liquid polymer phase that will result in a much lower polymerization rate. This polymerization rate can be low enough to operate this system without adding a catalyst poison or "killer." If a catalyst killer is required (e.g., to prevent reactions in the high pressure recycle) then provision must be made to remove any potential catalyst poisons from the recycled propylene rich monomer stream e.g., by the use of fixed bed adsorbents or by scavenging with an aluminum alkyl.

Alternatively, the HPS can be operated over the critical pressure of the monomer or monomer blend but within the monomer/polymer two-phase region. This is the economically beneficial method if the polymer is to be produced with a revamped high-pressure polyethylene (HPPE) plant. The recycled HPS overhead is cooled and "dewaxed" before being returned to the suction of the secondary compressor, which is typical of HPPE plant operation.

The polymer from this intermediate or high pressure vessel will then go through another pressure reduction step to a low pressure separator. The temperature of this vessel will be maintained above the polymer melting point so that the polymer from this vessel can be fed as a liquid directly to an extruder or static mixer. The pressure in this vessel will be kept low by using a compressor to recover the unreacted monomers, etc to the condenser and pumping system referenced above.

In addition to autoclave reactors, tubular reactors, or a combination of these reactors, loop-type reactors are useful in the embodiments of the invention. In this reactor type, monomer enters and polymer exits continuously at different points along the loop, while an in-line pump continuously circulates the contents (reaction liquid). The feed/product takeoff rates control total average residence time. A cooling jacket removes reaction heat from the loop.

In general, feed inlet temperatures are generally near to or below ambient temperatures to provide cooling to the exothermic reaction in the reactor operating above the crystallization temperature of the polymer product.

The processes described herein can have residence times as short as 0.5 seconds and as long as an hour. In some embodiments, the residence times are from 10 seconds to 60 minutes, or from 15 seconds to 30 minutes, or from 30 seconds to 30 minutes, or from 2 minutes to 30 minutes. In some embodiments, the residence time can be selected from 10, 30, 45, 50 seconds, 1, 5, 10, 15, 20, 25, 30 and 60 minutes. Practical maximum residence times can be selected from 5, 10, 15, 30, 60 minutes. In general, the embodiments of the invention choose residence times of from 1 minute to 60 minutes; more particularly 2 minutes to 30 minutes.

Dividing the total quantity of polymer that is collected during the reaction time by the amount of monomer added to the reaction yields the conversion rate. The monomer-to-polymer conversion rate for the described processes can be as high as 90%. For practical reasons, for example for limiting viscosity, lower conversions could be desirable. In addition, for practical reasons, for example for limiting the cost of monomer recycle, minimum conversions may be desired. Thus, the process can be run at practical conversion rates of 80, 60 or less percent, 3-80, 5-80, 10-70, 15-70, 20-70, 25-60, 3-60, 5-60, 10-60, 15-60, 20-60, 10-50, 5-40, 10-40, 40-50, 15-40, 20-40, or 30-40 percent conversion, preferably greater than 10, or greater than 20 percent conversion.

In reactors with multiple injection points for catalyst and feed, there exists the possibility to tailor the polymer design. Use of more than one catalyst having different molecular weight and structural capabilities allows a wide variety of product compositions (e.g., bimodal, linear mixed with long chain branched). The various olefins will have differing reactivity ratios for a given catalyst so a plug flow operation will allow compositional tapering if for instance no feeds are injected down the reactor or compensation of the tapering if the more reactive monomer is injected preferentially along the tube. A single zone ideal back mixed autoclave reactor will not allow tapering of polymer composition but the use of multiple catalysts is still applicable. Operation of two such autoclaves in series or parallel can allow the use of tailoring by altering the composition of fresh feed to the second reactor.

When multiple reactors are used, the production of polymer blends is possible. In one embodiment, homopolymer and copolymer blends are made by using at least two reactors in parallel or series. The homopolymers could be polypropylene, polybutene, polyhexene, polyoctane, etc. In one embodiment, the homopolymer comprises polypropylene, polybutylene, polyhexene, and polystyrene. In another embodiment, the homopolymer is polypropylene. The copolymers could be any two- or three-component combinations of ethylene, propylene, butene-1, 4-methylpentene-1, hexene-1, octene-1, styrene, norbornene, 1,5-hexadiene, and 1,7-octadiene. In another embodiment, the copolymers are made from a two-component combination of ethylene, propylene, butene-1, hexene-1, styrene, norbornene, 1,5-hexadiene, and 1,7-octadiene. In yet another embodiment, the copolymer is an ethylene-propylene, propylene-butene-1, propylene-hexene-1, propylene-butene-1, ethylene-butene-1, ethylene-hexene-1, ethylene-octene-1 copolymer. When the polymer blends are made in a series reactor cascade, one or more upstream reactors are fed with a single monomer-containing feed, while the feed of one or more downstream reactors is augmented with a comonomer feed stream.

Product Separation and Downstream Processing:
Phase Behavior

The phase of a hydrocarbon, or mixture of hydrocarbons, such as the polymerization system, or the polymer-rich or monomer-rich phases forming from the polymerization system in the one or more separators of the disclosed processes, or any other mixtures comprising monomers and polymers, is a key thermodynamic property. A mixture's phase may be either solid, vapor, liquid, or a supercritical fluid. For purposes of this disclosure, the supercritical fluid phase may at times simply be referred to as the fluid phase. A mixture is determined to be in the supercritical fluid phase when its temperature exceeds its critical, or pseudo-critical temperature and when its pressure exceeds its critical, or pseudo-critical pressure.

Figure 6:
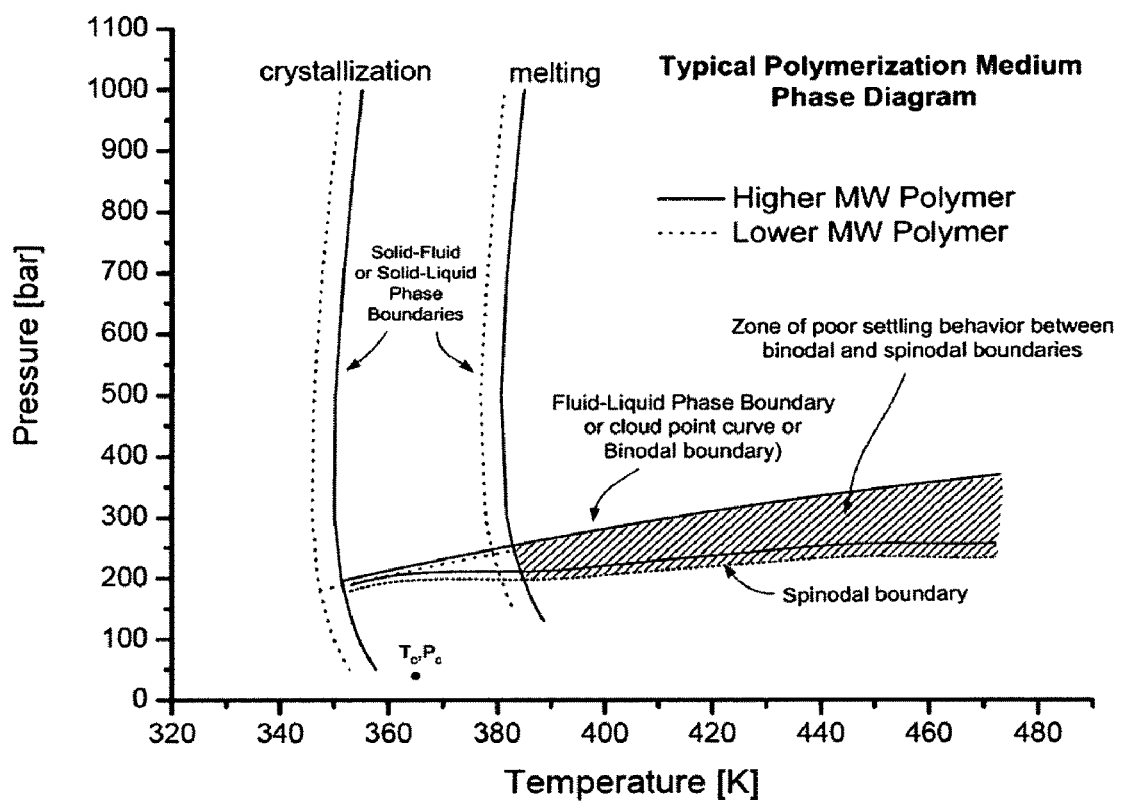
FIG. 6 presents a phase diagram for a typical polymerization medium phase diagram of the current disclosure.

When mixtures change their phase by virtue of changes in temperature, pressure, and/or composition, they are said to cross phase boundaries, which may be represented as a locus of points (curves) on temperature-pressure diagrams, where said curves apply to a mixtures of a given composition. For purposes of this disclosure, the phase boundaries between fluid and liquid phases will be called fluid-liquid phase boundaries and transitions of temperatures or pressures that cross these boundaries may be referred to as fluid-liquid transitions. For purposes of this disclosure, the phase boundaries between the single homogeneous fluid and two fluid (fluid-fluid) phases will be called cloud point curves. As a homogeneous single fluid (liquid or supercritical fluid) mixture crosses the cloud point, it is transformed into two phases of different densities and compositions. A given point on the cloud point curve will be referred to by its cloud point pressure. The cloud point pressure can be experimentally determined as the pressure at which, and below which, at a given temperature, the polymerization system becomes turbid as described in J. Vladimir Oliveira, C. Dariva and J. C. Pinto, Ind. Eng, Chem. Res. 29 (2000) 4627. For purposes of this disclosure and the claims thereto, the cloud point is measured by shining a laser through the selected polymerization system in a cloud point cell onto a photocell and recording the pressure at the onset of rapid increase in light scattering for a given temperature. For purposes of illustration, the cloud point curve of a typical polymerization medium is depicted in FIG. 6 (1 bar=100 kPa).

Phase boundaries between solids and fluids (i.e., between solids and liquids or between solids and supercritical fluids) will be called solid-fluid (or solid-liquid, when the fluid phase is a liquid) phase boundaries. Crossing solid-fluid (or solid-liquid) phase boundaries will be called solid-fluid (or solid-liquid) transitions. A single point on a solid-fluid (or solid-liquid) phase boundary may be referred to as solid-fluid (or solid-liquid) transition temperature. However, many of mixtures referred to in this disclosure exhibit two different solid-fluid (or solid-liquid) phase boundaries, depending on the direction of the phase change. One is for melting, i.e. when the direction of phase change is from a solid or from a solid-fluid mixture to a fluid phase (one or more liquid or supercritical fluid phases) without solids, and the other is for crystallization, i.e. when the direction of phase change is from a solids-free fluid (one or more liquid or supercritical fluid) phase to a phase comprising a solid phase. When it is necessary to differentiate between these two types of transitions, the terms melting and crystallization will be used, and a single point on the phase boundary will be referred to by its melting temperature or its crystallization temperature. For purposes of this disclosure and the claims thereto, solid-fluid (or solid-liquid) also referred to as crystallization phase transitions are determined by shining a helium laser through the selected polymerization medium in a cell onto a photocell and recording the temperature (at a given pressure) at the onset of rapid increase in light scattering indicating the formation of a solid phase (crystallization), or at the onset of a rapid decrease in light scattering indicating the disappearance of a solid phase (melting). For purposes of illustration, solid-fluid (solid-supercritical fluid or solid-liquid) phase boundaries of both the crystallization and melting types for a typical polymerization medium are depicted in FIG. 6.

Phase Densities

As described above, the measurement of phase boundaries is determined by making multiple cloud point pressure measurements at a variety of temperatures for a given composition mixture, using the experimental methods described in J. Vladimir Oliveira, C. Dariva and J. C. Pinto, Ind. Eng, Chem. Res. 29 (2000) 4627. This phase boundary data is used to fit the Equation of State (EOS) models to predict the thermodynamic and physical properties of the individual phases, i.e. fluid, liquid, solid, and/or vapor over a range of temperature and pressure. For the experimental work supporting the current disclosure, a version of the Statistically Associating Fluid Theory (SAFT) EOS called SAFT1 (H. Adidharma, M. Radosz, Ind. & Eng. Chem. Res. 37 (1998) 4453) has been used for this purpose. Because phase separation experiments are run at high temperatures and pressures, it is usually impractical to sample individual phases in multi-phase mixtures to determine their composition or physical properties, and thus the predicted properties of these phases have been used in lieu of directly measured values in support of the current disclosure. This approach has been validated in other instances, where material balances from pilot plants and commercial plants have been used to validate SAFT1 EOS predictions. As an example, SAFT1 EOS models of the polymerization systems and liquid-liquid separation systems described in U.S. Pat. Nos. 6,881,800 and 7,163,989, which include polymers, monomers, and catalysts somewhat similar to the current disclosure, but which include relatively large amounts of alkane solvents in the polymerization medium, and are operated at lower pressures than the current disclosure, have been verified by these types of material balances.

Spinocal Decomposition

Figure 5:
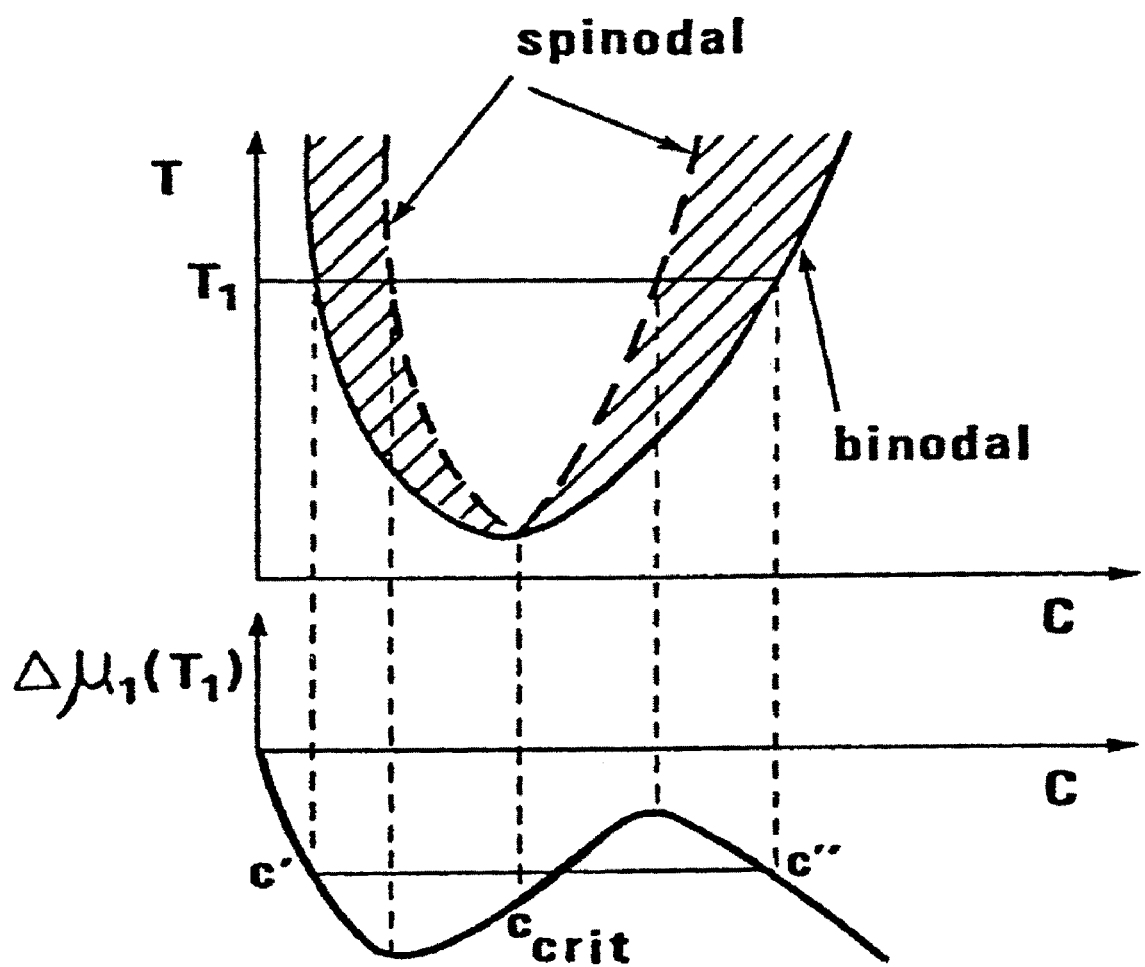
FIG. 5 presents a graphical depiction of the thermodynamic definition of binodal and spinodal boundaries.

Phase boundaries of mixtures, such as a polymerization medium, may be depicted as temperature-pressure (T,P) diagrams for a constant composition mixture as illustrated in FIG. 6, or alternatively, they may be depicted as T,c diagrams for mixtures at constant pressure (as illustrated conceptually by the binodal curve in FIG. 5) or P,c diagrams for mixtures at constant temperature, where the symbol c is used to denote composition. For multi-component mixtures the composition is designated by a series of composition variables $c_i$, where i refers to each component in the mixture, but for a binary mixture, a single variable c will adequately denote the composition. In general, the polymerization medium of the current disclosure is a multi-component mixture, but for our current purposes of illustration, there is no generality lost by considering the polymerization medium to be a binary mixture of polymer and a single low molecular weight hydrocarbon, and the composition variable c can be taken to denote polymer concentration. If we take, by way of example, a phase boundary depicted by T,c at constant P as depicted in FIG. 5, then the fluid-liquid phase boundary appears as a curve (which, following terminology commonly used in the art, we have designated as a binodal curve) where a minimum value of temperature (which is also commonly called the Lower Critical Solution Temperature, or LCST) exists at a concentration called the critical polymer concentration ($c_{crit}$). This binodal curve, which represents the two-phase (fluid-liquid) phase boundary, is a locus of points where the single phase polymerization medium is in equilibrium with a two-phase mixture of monomer-rich and polymer-rich phases. From FIG. 5, it is apparent that for any given temperature and pressure, which is represented by horizontal line at $T_1$, there are two mixture compositions that are in equilibrium with the polymerization medium, and thus in equilibrium with each other. One of these mixture compositions is a monomer-rich composition, and the other a polymer-rich composition (these two compositions are designated as c' and c" on FIG. 5). The bottom part of FIG. 5 illustrates a curve representing the chemical potential ($\Delta\mu_1$) of the binary mixture as a function of c at a temperature equal to $T_1$ (note that a similar curve could be constructed for all other values of T). Note also that $\Delta\mu_1$(c')=$\Delta\mu_1$(c"), since for two mixtures to be in equilibrium, their chemical potentials must be equal. At other values of c on this curve, $\Delta\mu_1$ assumes other values, since these other compositions are not in equilibrium with c' and c". Along this $\Delta\mu_1$ curve, there are two other special points, where the first partial derivative of $\Delta\mu_1$ with respect to composition is zero ($\partial\Delta\mu_1/\partial c=0$). This is the thermodynamic criterion that defines the spinodal boundary, as is illustrated by the graphical construction in FIG. 5. For compositions on, or inside, the spinodal boundary, the compositions of the monomer-rich and polymer-rich phases differ sufficiently from equilibrium to form a thermodynamically unstable two-phase mixture, which tends to form a co-continuous morphology rather than a morphology where one of the two phases is dispersed as droplets in a continuum of the other phase. Inside the cross-hatched area in FIG. 5, the mixture tends to form a morphology where one of the two phases is dispersed in a continuum of the other phase. When the polymer concentration in the polymerization medium is higher than $c_{crit}$, the polymer-rich phase is continuous, and when the polymer concentration in the polymerization medium is lower than $c_{crit}$, the monomer-rich phase is continuous. In many embodiments of the current invention, the polymerization medium is a single phase fluid, such that its thermodynamic state (T,P,c) would place it in the single phase region outside the binodal boundary on FIG. 5. The process of spinodal decomposition refers to a process by which a rapid change in the temperature or pressure is effected to move the thermodynamic state of the system across both the binodal and spinodal boundaries to a point inside the spinodal boundary. For this change to be effective in producing the desired co-continuous morphology, the time that the thermodynamic state of the system resides in the area between the binodal and spinodal boundaries (cross-hatched area of FIG. 5) is short enough that the undesired morphology does not have sufficient time to become established. The exact value of time that satisfies this criterion must be determined empirically for each polymerization medium. Spinodal boundaries may also be depicted on phase diagrams which plot pressure vs. temperature at constant composition, as illustrated in FIG. 6. A full treatment of this concept may be found in the paper "A Low-Energy Solvent Separation Method", T. G. Gutowski et. al., Polymer Engineering and Science, March 1983, v. 23, No. 4.

The term "monomer-rich phase" or "monomer-rich stream" are defined to mean a phase or stream that concentrate the monomers present in a stream or equipment upstream in the process. The monomer-rich phase in the phase separator of the present disclosure, for example, concentrates the monomers that were present in the reactor or in its effluent. The monomer-rich stream leaving the phase separator of the present disclosure contains the monomers in a higher concentration than they are present in the reactor effluent. Specifically the monomer rich stream has at least 10% more monomer present as compared to the concentration of the monomers present in the effluent at the exit of the reactor, preferably at least 20% more, preferably at least 30 % more, preferably ate last 40% more, preferably at least 50% more. Analogously, the term "polymer-rich phase" or "polymer-rich stream" is defined to mean a phase or stream that concentrates the polymer present in a stream or equipment upstream in the process. The polymer-rich phase in the phase separator of the present disclosure, for example, concentrates the monomers that were present in the reactor or in the reactor effluent. The monomer-rich stream leaving the phase separator of the present disclosure contains the monomers in a higher concentration than they are present in its effluent. Specifically the polymer rich stream has at least 10% more polymer present as compared to the concentration of the polymer present in the effluent at the exit of the reactor, preferably at least 20% more, preferably at least 30 % more, preferably ate last 40% more, preferably at least 50% more.

Separation

The one or more reactor effluent streams may be depressurized to an intermediate pressure significantly below the cloud point pressure. This allows separation of a polymer-rich phase for further purification and a monomer-rich phase (also known as the polymer-lean phase) for recycle back to the reactor(s) and to the reactor effluent stream(s). As discussed above, the reactor effluent mixed stream may be heated before pressure let-down. The separation of the polymer-rich phase and the polymer-lean phase in the processes disclosed herein is carried out in a vessel known as a high-pressure separator (also referred to as an HPS, separator, gravimetric separator or separator vessel). The separator may also be used for blending of two or more reactor effluents from parallel reactor trains as disclosed in U.S. Patent Application No. 60/876,193 filed on Dec. 20, 2006.

The polymer-rich phase of the separator can then be optionally transferred to a low pressure separator (LPS) running at just above atmospheric pressure for a simple flash of light components, reactants and oligomers thereof, for the sole purpose of producing a low volatile-containing polymer melt entering the finishing extruder or static mixer.

In one form of monomer/solvent separation and recycle processes depicted in FIGS. 2-4, the polymerization is conducted herein above the cloud point for the polymerization system. Then, the reactor effluent mixed stream(s) are transferred into a gravimetric separator, where the pressure is allowed to drop below the cloud point. This advantageously results in the denser, polymer-rich phase separating from the lighter monomer-rich (polymer-lean) phase. As can be appreciated by those skilled in the art, it can optionally be necessary to increase the temperature in the gravimetric separator to prevent the formation of a solid polymer phase as the polymer becomes more concentrated. The monomer-rich (polymer-lean) phase is then separated and recycled to the reactors and the reactor effluent stream(s) while the polymer-rich phase is fed to a coupled devolatilizer—such as a LIST dryer (DTB) or devolatizing extruder.

The recycle runs through a low pressure separator, where the pressure depends on the pressure-temperature relationship existing within the reactor. For example, polymerization can be carried out under agitation in the single-phase region in the reactor at 40-200 MPa and 95-180° C. On exiting the reactor, the reactor effluent mixed stream is discharged into a low-pressure separator vessel, where the pressure is dropped to a level of 25 MPa bar or lower, in which case, the mixture is below its cloud point, while the monomer has not yet flashed off. Under such conditions, it would be expected from Radosz et al., Ind. Eng. Chem. Res. 1997, 36, 5520-5525 and Loos et al., Fluid Phase Equil. 158-160, 1999, 835-846 that the monomer-rich (polymer-lean) phase would comprise less than 0.1 wt % of low molecular weight polymer and have a density of approximately 0.3-0.4 g/mL. The polymer-rich phase would be expected to have a density of approximately 0.6-0.7 g/mL.

Assuming that the pressure is dropped rapidly enough, for example, greater than or equal to 6 MPa/sec, the phases will separate rapidly, permitting the recycle of the monomer-rich phase as a liquid, without the issue of having the monomer-rich phase return to the gas phase. As can be appreciated by those skilled in the art, this eliminates the need for the energy-intensive compression and condensation steps.

The polymer-rich phase is sent directly to a coupled devolatilizer. Suitable devolatilizers can be obtained, for example, from LIST USA Inc., of Charlotte, N.C. The devolatilization is a separation process to separate remaining volatiles from the final polymer, eliminating the need for steam stripping. Working under low vacuum, the polymer solution flashes into the devolatilizer, exits the unit and is then transferred on for further processing, such as pelletization.

Any low or very low molecular weight polymer present in the monomer-rich (polymer-lean) phase to be recycled can optionally be removed through "knock-out" pots, standard hardware in reactors systems, or left in the return stream depending upon product requirements and the steady-state concentration of the low molecular weight polymer fraction in the product.

In solution reactor processes, present practices employed by those skilled in the art typically effect separation by flashing monomer and solvent or accessing the high-temperature cloud point.

In another form of the monomer/solvent separation and recycle processes depicted in FIGS. 2-4, polymerization is conducted at conditions below the cloud point, with the polymer-monomer mixture transported to a gravimetric separation vessel, where the pressure could be further lowered if desired to enhance phase separation of the polymer-rich and monomer-rich phases. In either of the forms herein described, the monomer, for example, propylene, is recycled while staying in a relatively high density, liquid-like (homogeneous or bulk liquid) state. Once again, one or more knock-out pots or sieves can be employed to aid in the removal of low molecular weight polymer from the recycle stream.

As can be appreciated, there are possible and optimal operating regimes for reactors and for the gravity (lower critical solution temperature (LCST) separator. For reactors operating in a single liquid phase regime, a possible region for operation is just above the LCST and vapor pressure (VP) curves. The optimal region (shown within the shaded oval) for operation occurs at temperatures just above the lower critical end point (LCEP) and at pressures slightly above the LCST curve.

Advantageously, the liquid monomer-rich (polymer lean) recycle stream can be recycled to the reactor using a liquid pumping system instead of a hyper-compressor, required for conventional polyethylene units.

The one or more reactor effluent streams are depressurized to an intermediate pressure significantly below the cloud point pressure. This allows separation of a polymer-rich phase for further purification and a polymer-lean phase for recycle compression back to the reactor and back for combination with the reactor effluent streams as depicted in FIGS. 2-4. In one form of the invention disclosed herein, the reactor effluent stream is heated before pressure let-down via a heated polymer-lean recycle stream in order to avoid the separation of a solid polymer phase causing fouling. Separation of the polymer-rich phase from the polymer-lean phase is carried out in a vessel known as a high-pressure separator (HPS). Since this vessel also has a significant residence time, the catalyst activity may be killed by addition of a polar species such as water, alcohol or sodium/calcium stearate. The choice and quantity of killing agent will depend on the requirements for clean up of the recycle propylene and comonomers as well as the product properties, if the killing agent has low volatility.

Alternatively, the intermediate separation can be done at pressures well below the critical point so that the monomer concentration and therefore reactivity in the high-pressure separator is relatively low. The relatively small amount of continued polymerization in this vessel can not be a problem so addition of catalyst deactivating compounds can be avoided presuming that no undesired reactions occur in the high or intermediate pressure recycle system. If no killing compounds are added then the killer removal step may be eliminated.

The monomer/solvent separation and recycle process for a continuous solution polymerization process disclosed herein relates to a process for the economical separation and recovery of the polymer from the lower molecular weight components of the reaction medium for a continuous solution polymerization system. One exemplary polymerization system is described in WO 2004/026921 and includes the steps of contacting, in a polymerization system, olefin monomers having three or more carbon atoms, and optionally a wide range of olefinic and/or diolefinic comonomers, with one or more metallocene catalyst compounds, one or more activators, and an optional inert diluent or solvent, at a temperature above the solid-fluid transition temperature of the polymerization system, and at a pressure no lower than 10 MPa below the cloud point pressure of the polymerization system and less than 200 MPa. The effluent from the polymerization reactors, i.e. the polymerization medium, contains the unreacted monomer and optional comonomers, any diluent or solvent present, and the polymer product. In one or more embodiments of the current invention, the polymerization medium leaving the aforementioned polymerization process is directed to a pressure letdown device with heating of the reactor effluent stream. The pressure letdown device is located upstream of a fluid-liquid phase separation vessel. The pressure letdown device rapidly reduces the pressure of the polymerization medium to a pressure below the cloud point pressure to form a two-phase mixture comprising a polymer-rich phase and a monomer-rich phase. Preferably the temperature of the polymerization medium is above the crystallization temperature of the polymer in the polymerization medium. The polymer-lean phase and polymer-rich phases are separated within the fluid-liquid phase separation vessel by gravity settling, and the separated polymer-lean phase is recycled to the polymerization system and to the reactor effluent stream.

The polymer lean and polymer rich phases in the polymerization medium after is has been letdown, (preferably to a pressure below the cloud point pressure and a temperature above the crystallization temperature of the polymer (advantageously, at least 10° C. above the crystallization temperature, or at least 20° C. above the crystallization temperature, or at least 50° C. above the crystallization temperature, or if the polymer has no crystallization temperature above 80° C., preferably above 90° C., preferably above 100° C.) typically have significantly different densities. The difference between the two densities is typically 0.2 g/mL or more, alternatively 0.3 g/mL or more, or 0.4 g/mL or more, or 0.5 g/mL or more, or 0.6 units or more. In a useful embodiment, the polymer is kept in solution or molten state until after exiting the phase separation vessel. In another embodiment, the pressure in the reactor (or in at least one reactor if more than one reactor is in use) is between 7 and 100 MPa higher than the pressure in the separation vessel (such as the high pressure separator), preferably 15 and 75 MPa and 25 and 50 MPa.

In one form of the process, the polymerization system, which preferably includes no inert solvent, produces a propylene-rich polymer at a temperature above the crystallization temperature of the polymerization medium, and at a pressure above the cloud point pressure of the polymerization medium. This 5 single-phase polymerization medium is directed with or without further heating to the pressure reducing device, which may be a letdown valve. The pressure reducing device rapidly reduces the pressure of the polymerization medium, typically at a rate of 2 MPa/sec or more (preferably 6 MPa/sec or higher), to a pressure below the cloud point pressure of the polymerization medium (and typically also below the pressure at the spinodal boundary), to form a two-phase mixture comprising a polymer-rich phase and a polymer-lean phase. As a direct result of the rapid rate of pressure letdown, the polymer-lean and polymer-rich phases are easily separated within the fluid-liquid phase separation vessel by gravity settling, and the separated polymer-lean phase is recycled to the polymerization system and to the reactor effluent stream, which includes splitting of the recycle stream and optionally heating one of the two polymer-lean recycle stream, optional removal of some hydrogen from the recycle streams, optional removal of any low molecular weight polymer that precipitates from the recycle streams, and/or optional drying of the recycle streams over a desiccant bed. The polymer-rich phase from the gravimetric separator is directed to a devolatization system for the removal of any remaining unreacted monomers or other volatile components.

In particular, the processes disclosed herein provide an effective pathway for separation of polymer from the low molecular weight components of the polymerization medium and recycle of the low molecular weight components in a polymer-lean recycle stream for embodiments where the polymerization process is a bulk homogeneous supercritical polymerization process (such as in the polymerization process of WO 2004/026921), and in which the polymer product has propylene as its principal monomer with optional comonomers, an example of which is supercritical polypropylene polymerization (SCPP). As will be discussed in more detail below, the efficient separation of monomer and polymer is achieved by advantageously utilizing the cloud point and solid-fluid phase relationships for the relevant olefin or olefinic mixture; e.g. polypropylene-propylene, poly(propylene-ethylene)-propylene-ethylene, etc. mixtures.

In one embodiment of the invention, the process for separating the polymerization medium derived from any of the polymerization systems is described in the disclosure WO 2004/026921 into a polymer-lean phase and a polymer-rich phase, and for the subsequent recovery of the polymer in a devolatization process, and for the recycle of the polymer-lean phase in an economical and efficient manner back to the polymerization process and to the reactor effluent stream with minimal processing, thereby achieving the lowest practical investment and operating costs for a commercial implementation of the afore-mentioned polymerization process. The polymerization medium derived from this polymerization process is in a supercritical fluid state, and may consist of a single super-critical fluid phase, or a two phase fluid-fluid or fluid-liquid mixture. The low molecular weight components of the polymerization medium may contain only the unreacted monomers of the polymerization, or may optionally include an inert solvent at a concentration of up to 40 wt %, and the polymer component of the polymerization medium may contain either a single polymer or a blend of two or more polymers (such as those disclosed in WO 2004/20691). The process preferably consists of a series of sequential steps: (a) Reduction of the pressure of the polymerization medium via a pressure reducing device to a pressure below the cloud point pressure, but high enough to avoid full or partial vaporization of the polymer-lean phase, resulting in the formation of a two phase mixture—a lower density monomer-rich phase, and a higher density polymer-rich phase; (b) Transfer of the two phase fluid-fluid or fluid-liquid mixture leaving the pressure reducing device into a gravity settling device designed with sufficient size to provide sufficient (typically more than one minute, preferably between 1 and 30 minutes) residence time, more preferably between 1 and 15 minutes, to disengage and settle the two phases into a top layer (monomer-rich phase) and a bottom layer (polymer-rich phase); (c) Transfer of the polymer-rich phase to a cascade of flash vessels with ever-decreasing pressure to progressively remove remaining monomers and solvent from the polymer-rich phase. These vessels may be operated adiabatically, or one of more of them may heat the polymer solution with a heating medium to reduce the residual volatiles content of the polymer; (d) Recycle of the polymer-lean phase directly to the polymerization feed system and to the reactor effluent stream without further processing. These steps can be modified by 1) adding optional steps, such as heating and pressurizing the polymer-lean recycle stream, 2) restricting operating conditions to optimal ranges, and 3) restricting the composition of the polymerization medium itself.

Phase separation temperature may be modified with the methods of heating of the reactor effluent stream described herein.

Phase separation pressure could be modified based on the principal of defining an optimal range between the highest possible pressure (cloud) point pressure, and the lowest possible pressure (pressure where full or partial vaporization of the monomer-rich phase occurs). The first modification would replace the cloud point pressure with the spinodal boundary pressure, and then subsequent modifications could narrow the range by setting maximums progressively lower than the spinodal boundary, and minimums progressively higher than the vapor pressure (full or partial vaporization of the monomer-rich phase). These concepts are illustrated below. A benefit of optimizing pressure is to minimize the total cost of product recovery and monomer-rich phase recycle systems. Higher pressures raise the cost of product recovery (more monomer to flash off), but lower the cost of monomer-rich phase recycle—less pumping, cooling cost.

The use of spinodal decomposition for enhancing phase separation involves setting modifications on both the separation pressure (as described above) and the rate of pressure reduction by the pressure reducing device, as outlined below. The benefit of spinodal decomposition is faster disengagement of the two phases downstream of the pressure reducing device, and thus savings in the investment cost of the HPS vessel. The difference in density of the polymer-lean and polymer-rich phases is discussed in section below, as it relates to the separation pressure. A range of phase density difference could selected with the claimed benefit being faster settling and savings in the investment cost of the HPS vessel.

High-Pressure Separator, Recycle System, and Downstream Processing

In one embodiment of the invention, the polymerization is as described in WO 2004/026921 (e.g. the pressure is above the cloud point pressure for the polymerization medium) and the polymerization medium is continuously transferred (preferably without heating) to a pressure reducing device (which may be a letdown valve), where the pressure is reduced below the cloud point pressure (and preferably the temperature is kept above the crystallization point of the polymer in the polymerization medium). This advantageously results in the formation of a more dense, polymer-rich phase and a less dense monomer-rich phase, which are then transferred to a fluid-liquid separation vessel (also referred to as a phase separation vessel) called a High Pressure Separator (HPS) or a gravimetric separator, where the monomer-rich (polymer-lean) phase and polymer-rich phase separate into two layers, typically via gravity settling. In one form, the pressure in the reactor (or at least one reactor if more than one is in use) is between 7 and 100 MPa higher than the pressure in the separation vessel (such as the high pressure separator), preferably between 15 and 75 MPa, preferably between and 25 and 50 MPa.

Phase Separation Temperature

In embodiments of the current invention, the heating of the reactor effluent mixed stream upstream of the pressure letdown device is minimized within the constraints imposed by the phase diagram for the polymerization medium. For efficient phase separation, the temperature of the reactor effluent mixed stream at the entrance to the pressure reducing device (letdown valve) is high enough to prevent a solid-liquid phase separation from taking place upstream of, or inside, the fluid-liquid phase separation vessel. The efficient phase separation temperature is also high enough such that when the pressure is reduced across the pressure reducing device (letdown valve), that there exists a pressure where an efficient separation of the polymerization medium into a monomer-rich phase and a polymer-rich phase can occur at a high enough pressure to prevent full or partial vaporization of the monomer-rich phase. The applicable operating range of temperatures and pressures that satisfy these criteria may be determined from a temperature-pressure phase diagram of the polymerization medium (such as the type depicted in FIG. 6). The reactor effluent mixed stream may be at a temperature at the inlet of the pressure reducing device (letdown valve) that is 0 to 100° C., or 5 to 50° C., or 10 to 30° C. above minimum required temperature for efficient phase separation.

In consideration of the efficient phase separation temperature criteria, the process of the current disclosure can be carried out at the following temperatures. In one embodiment, the temperature of the reactor effluent mixed stream is above the solid-fluid phase transition temperature of the polymer-containing fluid reaction medium at the reactor pressure, preferably at least 5° C. above the solid-fluid phase transition temperature of the polymer-containing fluid reaction medium at the reactor pressure, more preferably, at least 10° C. above the solid-fluid phase transformation point of the polymer-containing fluid reaction medium at the reactor pressure. In another embodiment, the temperature is between 50 and 350° C., or between 60 and 250° C., or between 70 and 200° C., or between 80 and 180° C., or between 90 and 160° C., or between 100 and 140° C.

Spinodal Decomposition

In one of the embodiments of the current disclosure, the pressure reducing device is designed to drop the pressure rapidly enough, and to an optimal pressure, via the process of spinodal decomposition, which results in a phase morphology of an interpenetrating network of the two phases (also called a co-continuous morphology), with the desirable result that the polymer-rich and monomer-rich (polymer-lean) phases disengage easily and settle rapidly in the fluid-liquid gravity separation vessel. Spinodal decomposition prevents the formation of a very slow disengaging and slow settling mixture of monomer-rich (polymer-lean) and polymer-rich phases with a morphology that has droplets of monomer-rich phase dispersed in a continuous polymer-rich phase, which tends to occur naturally when the polymer concentration in the fluid exceeds a critical value, and when temperature and pressure in the phase separating vessel are in the region of the phase diagram between the fluid-liquid phase boundary (bindoal boundary) and the spindoal boundary as illustrated by the cross-hatched area in FIG. 6. In some embodiments of the current invention, the polymer concentration in the polymerization medium is higher than the critical concentration described above (and conceptually illustrated in FIG. 5) and thus these embodiments utilize the process of spinodal decomposition to avoid gravity settling problems. In one embodiment of the spinodal decomposition process for supercritical polymerization systems (such as those described in WO 2004/026921), the rate of pressure reduction across the pressure reducing device (letdown valve) is 1 MPa/sec or more, or 2 MPa/sec or more, or 4 MPa/sec or more, or 6 MPa/sec or more.

Phase Separation Pressure:

In all embodiments of the current disclosure, the pressure downstream of the pressure reducing device (letdown valve) and inside the fluid-liquid phase separation vessel is selected to be below the cloud point pressure to ensure that a fluid-liquid phase separation will take place, but high enough to be above the vapor pressure of the monomer-rich phase to prevent full or partial vaporization of the monomer-rich phase. In some embodiments, to induce rapid phase separation and settling, the pressure in the fluid-liquid phase separation vessel is lower than the spinodal boundary pressure. Within this pressure range, i.e. below the spinodal boundary pressure and above the vapor pressure of the monomer-rich (polymer-lean) phase, an operating pressure can be chosen that will prove to be most economical. Higher pressures reduce the cost of pumping or compression of the monomer-rich phase for recycle, but higher pressures also reduce the rate of phase disengagement and result in higher density of the monomer-rich (polymer-lean) phase, which reduces the density difference between polymer-rich and monomer-rich (polymer-lean) phases, thereby slowing the rate of settling in the fluid-liquid phase separation vessel, and ultimately requiring a larger vessel. In one embodiment of the disclosure, the pressure downstream of the pressure reducing device (letdown valve) and inside the fluid-liquid phase separation vessel is below the spinodal boundary pressure, or at least 1 MPa lower than the spinodal boundary pressure, or at least 5 MPa lower than the spinodal boundary pressure, or at least 10 MPa lower than the spinodal boundary pressure. In one embodiment, the pressure is no lower than the vapor pressure of monomer-rich (polymer-lean) phase, no lower than 0.2 MPa above, no lower than 1 MPa above, or no lower than 10 MPa above the vapor pressure of the monomer-rich (polymer-lean) phase. In another embodiment, the difference in density between the polymer-rich phase and the monomer-rich (polymer-lean) phase is at least 0.1 g/mL, or at least 0.2 g/mL, or at least 0.3 g/mL, or at least 0.4 g/mL, or at least 0.5 g/mL or at least 0.6 g/mL. Density of the phases at any given pressure and temperature is measured by simple volumetric methods, for example by measuring the weight of a phase with a known volume. In another embodiment, the pressure is in the phase separation vessel between 1 and 10 MPa, or 2 and 40 MPa, or 5 and 30 MPa, or 7 and 20 MPa, or between 10 and 18 MPa. In another embodiment, the gravimetric separation vessel operates at a pressure above 30 MPa, or above 50 MPa, or above 70 MPa.

At the reactor outlet valve, the pressure drops to begin the separation of polymer and unreacted monomer, co-monomers, inerts, like ethane, propane, solvents, like hexanes, toluene, etc. The temperature in the separation vessel will be maintained above the polymer product's crystallization temperature (or above 80° C. if the polymer product has no crystallization point) but the pressure may be below the critical point. The pressure need only be high enough that the monomer, for example propylene, can be condensed against standard cooling water. The liquid recycle stream can then be recycled to the reactor with a liquid pumping system instead of the hyper-compressors required for polyethylene units. The lower pressure in this separator will reduce the monomer concentration in the liquid polymer phase which will result in a much lower polymerization rate. This polymerization rate in some embodiments may be low enough to operate this system without adding a catalyst poison or "killer". If a catalyst killer is required (e.g., to prevent reactions in the high pressure recycle) then provision must be made to remove any potential catalyst poisons from the recycled propylene rich monomer stream e.g. by the use of fixed bed adsorbents or by scavenging with an aluminum alkyl.

Alternately, the separation vessel may be operated over the critical pressure of the monomer or monomer blend but within the monomer/polymer two-phase region. This is an economically desirable method if the polymer is to be produced with a revamped high-pressure polyethylene (HPPE) plant. The recycled separation vessel overhead may be cooled and dewaxed before being returned to the suction of the secondary compressor.

The polymer-rich phase from this separation vessel may then go through another pressure reduction step to a low pressure separator. The temperature of this vessel will be maintained above the polymer melting point so that the polymer from this vessel can be fed as a liquid directly to an extruder or static mixer. The pressure in this vessel will be kept low by using a compressor to recover the unreacted monomers, etc to a condenser and pumping system.

Polymer Recovery:

The polymer-rich phase may be sent directly to a coupled devolatilization system, which may contain one or more flash vessels, or low pressure separators (LPS), in series, each operating at a successively lower pressure, and the devolatization system may include as a final step a devolatizing extruder or other devolatizing devices such as a LIST DTB, which may be obtained from LIST USA Inc., of Charlotte, N.C. The low pressure separator vessel(s) may operate adiabatically, or optionally may have internal heaters of the thin film or falling strand type. This devolatilization is a separation process to separate remaining volatiles from the final polymer, without resorting to older, inefficient processes such as steam stripping. The final devolatizing device (extruder, LIST DTB, etc.) may operate under a strong vacuum, and may optionally use stripping agents such as water or nitrogen, to further reduce the volatiles content of the polymer. Once devolatized, the product exits the final devolatizing step and is then transferred on for further processing, such as pelletization and packaging.

Efficient and Economical Recycle of Polymer-Lean Phase:

In some embodiments of the current disclosure, one of the two polymer-lean recycle streams is recycled to the polymerization system with minimal processing to avoid costly investment in recycle equipment, and also to avoid consumption of costly utilities including heating media (steam, hot oil, electricity, etc.) and cooling media (cooling water, brine, cooling air, etc.). In embodiments where the temperature of the polymer-lean phase in the fluid-liquid separation vessel is higher than the polymerization system feed temperature, some cooling of the one polymer-lean recycle stream for recycle to the reactors maybe required. If removal of water or other polar contaminants is not required to maintain an economical catalyst productivity in the polymerization system, then cooling of the one polymer-lean recycle stream for recycle to the reactors to the polymerization feed temperature may be all that is required. One embodiment of this type involves cooling of the one polymer-lean recycle stream for recycle to the reactors to −40 to 100° C., or −20 to 90° C., or 0 to 90° C., or 20 to 90° C., or 50 to 90° C. Where removal of water or polar contaminants is required to maintain an economical catalyst productivity in the polymerization system, then drying over desiccant beds may be used, and the one polymer-lean recycle stream for recycle to the reactors must be a cooled to the lower of the polymerization feed temperature or the temperature where the desiccant has an acceptable capacity for removing water and/or other polar impurities (e.g. catalyst poisons). In this case where desiccant drying is required, one embodiment involves cooling the one polymer-lean recycle stream for recycle to the reactors to −40 to 80° C., or −20 to 60° C., or 0 to 40° C., or 20 to 40° C. When cooling the one polymer-lean recycle stream for recycle to the reactors, low or very low molecular weight polymer present in the stream may precipitate as solids, which may optionally be removed through filters, "knock-out" pots, etc. or left in the return stream depending upon product requirements and the steady-state concentration of the low molecular weight polymer fraction in the product.

Hydrogen Removal from Monomer-Rich Recycle Stream:

Many of the catalyst systems useful herein (such as those disclosed in WO 2004/026921) produce small amounts of hydrogen as a byproduct of the polymerization reaction. Additionally, hydrogen may be a reactor feed for the polymerization process described herein. Thus, in embodiments of the polymerization process where the hydrogen is not totally consumed in the polymerization process, there will be small amounts of hydrogen in the polymerization medium, and most of this hydrogen will remain in the polymer-lean phase leaving the fluid-liquid phase separation vessel. In one embodiment, this amount of hydrogen in the polymer-lean recycle stream is less than the amount of hydrogen added to the combined feed stream to the polymerization process, and in this embodiment, the fresh makeup of hydrogen to the polymerization process feed can be reduced to compensate for this recycled hydrogen, and no further processing of the polymer-lean recycle stream to remove hydrogen is required. In another embodiment, the amount of hydrogen in the polymer-lean recycle stream is greater than the total amount of hydrogen desired in the combined feed stream to the polymerization process, and in this embodiment, an additional treatment step may be added to the process for recycling the polymer-lean phase. This additional treatment step may comprise, but is not restricted to, single or multiple stage flash vessels, fractionation towers, or hydrogenation beds. Treatment for removal of hydrogen may be applied to the entire polymer-lean recycle stream, or in instances where the hydrogen removal requirements permit, to only a portion, or slip-stream of the polymer-lean recycle stream.

Polymer Products:

The propylene-based polymers produced by processes disclosed herein may be of any structures including block, linear, radial, star, branched, and combinations of these. The processes disclosed herein may produce polypropylene and copolymers of polypropylene. In other embodiments, the processes disclosed herein may make crystalline polymers. The processes disclosed herein may make copolymers including from 90 to 99.999 wt % of propylene units, from 0.000 to 8 wt % of olefin units other than propylene units and from 0.000 to 2 wt % α,ω-diene units. The accompanying olefin can be any of $C_2$-$C_{20}$ α-olefins, diolefins (with one internal olefin) and their mixtures thereof. More specifically, olefins include ethylene, butene-1, pentene-1, hexene-1, heptene-1, 4-methyl-1-pentene, 3-methyl-1-pentene, 4-methyl-1-hexene, 5-methyl-1-hexene, 1-octene, 1-decene, 1-undecene, and 1-dodecene. Copolymers of isotactic polypropylene made under homogeneous conditions include ethylene and $C_4$-$C_{12}$ comonomers such as butene, 3-methylpentene, hexene, 4-methylpentene, and octene.

Applications:

The processes disclosed herein may produce propylene based polymers that are used in any known thermoplastic or elastomer application. Examples include uses in molded parts, films, tapes, sheets, tubing, hose, sheeting, wire and cable coating, adhesives, shoesoles, bumpers, gaskets, bellows, films, fibers, elastic fibers, nonwovens, spunbonds, sealants, surgical gowns and medical devices.

Applicants have attempted to disclose all embodiments and applications of the disclosed subject matter that could be reasonably foreseen. However, there may be unforeseeable, insubstantial modifications that remain as equivalents. While the present disclosure has been described in conjunction with specific, exemplary embodiments thereof, it is evident that many alterations, modifications, and variations will be apparent to those skilled in the art in light of the foregoing description without departing from the spirit or scope of the present disclosure. Accordingly, the present disclosure is intended to embrace all such alterations, modifications, and variations of the above detailed description.

All patents, test procedures, and other documents cited herein, including priority documents, are fully incorporated by reference to the extent such disclosure is not inconsistent with this disclosure and for all jurisdictions in which such incorporation is permitted.

When numerical lower limits and numerical upper limits are listed herein, ranges from any lower limit to any upper limit are contemplated.

What is claimed is:

1. A monomer/solvent separation and recycle process for a continuous homogenous polymerization process comprising:
   providing one or more series or parallel homogenous polymerization reactors yielding one or more high-pressure dense fluid reactor effluent streams and a downstream gravimetric separator fluidly connected to the one or more reactors;
   pressurizing a polymer-lean stream from the gravimetric separator to form a high-pressure polymer-lean recycle stream;
   splitting the high-pressure polymer-lean recycle stream into two high-pressure polymer-lean recycle streams;
   heating one of the high-pressure polymer-lean recycle streams to form a heated high-pressure polymer-lean recycle stream;
   combining the heated high-pressure polymer-lean recycle stream with the one or more high-pressure reactor effluent streams to form a heated high-pressure reactor effluent mixed stream;
   passing the heated high-pressure reactor effluent mixed stream through a pressure let-down valve to form a heated low-pressure reactor effluent mixed stream; and
   passing the heated low-pressure reactor effluent mixed stream through the gravimetric separator to form the polymer-lean stream for recycle and a polymer-rich stream for further processing.

2. The process of claim 1, wherein when passing the heated high-pressure reactor effluent mixed stream through the pressure let-down valve, the pressure is reduced to pass the lower critical solution temperature phase boundary.

3. The process of claim 1, further comprising recycling the second high-pressure polymer-lean recycle stream back to the one or more homogenous polymerization reactors.

4. The process of claim 1, wherein the heating of the high-pressure polymer-lean recycle stream is done by one or more heat exchangers.

5. The process of claim 1, wherein the pressurizing of the polymer-lean stream from the gravimetric separator is by one or more high-pressure recycle pumps.

6. The process of claim 1, further comprising heating the one or more high-pressure reactor effluent streams through one or more heat exchangers before combining with the heated high-pressure polymer-lean recycle stream.

7. The process of claim 1 further comprising heating the heated high-pressure reactor effluent mixed stream through a heat exchanger before passing through the pressure let-down valve.

8. The process of claim 1, further comprising mixing the heated high-pressure reactor effluent mixed stream through a mixing device positioned before the pressure let-down valve.

9. The process of claim 8, wherein the mixing device is a static mixer or a mechanical agitation device.

10. The process of claim 1, wherein the pressure is dropped through the pressure let-down valve at a rate of at least 6 MPa/sec.

11. The process of claim 1, wherein at least one of the one or more series or parallel homogenous polymerization reactors produce polypropylene homopolymer.

12. A monomer/solvent separation and recycle process for a continuous homogenous polymerization process comprising:
   providing one or more series or parallel homogenous polymerization reactors yielding one or more high-pressure reactor effluent streams and a downstream gravimetric separator fluidly connected to the one or more reactors;
   splitting a low-pressure polymer-lean stream from the gravimetric separator into two low-pressure polymer-lean recycle streams;
   heating one of the low-pressure polymer-lean recycle streams to form a heated low-pressure polymer-lean recycle stream;
   passing the one or more high-pressure reactor effluent streams through one or more pressure let-down valves to form one or more low-pressure reactor effluent streams;
   combining the one or more low-pressure reactor effluent streams with the heated low-pressure polymer-lean recycle stream to form a heated low-pressure reactor effluent mixed stream; and
   passing the heated low-pressure reactor effluent mixed stream through the gravimetric separator to form the polymer-lean stream for recycle and a polymer-rich stream for further processing.

13. The process of claim 12, wherein when passing the one or more high pressure reactor effluent streams through the one or more pressure let-down valves, the pressure is reduced to pass the lower critical solution temperature phase boundary.

14. The process of claim 12, further comprising pressurizing and recycling the second low-pressure polymer-lean recycle stream back to the one or more homogenous polymerization reactors.

15. The process of claim 12, wherein the heating of the low-pressure polymer-lean recycle stream is by one or more heat exchangers.

16. The process of claim 12, further comprising passing the low-pressure polymer-lean stream from the gravimetric separator through one or more recycle pumps before splitting into the two low-pressure polymer-lean recycle streams.

17. The process of claim 12, further comprising heating the one or more high pressure reactor effluent streams through one or more heat exchangers before combining with the heated low-pressure polymer-lean recycle stream.

18. The process of claim 12, further comprising mixing the heated low-pressure reactor effluent mixed stream through a mixing device positioned before the gravimetric separator.

19. The process of claim 18, wherein the mixing device is a static mixer or a mechanical agitation device.

20. The process of claim 12, wherein the pressure is dropped through the one or more pressure let-down valves at a rate of at least 6 MPa/sec.

21. The process of claim 12, wherein at least one of the one or more series or parallel homogenous polymerization reactors produce polypropylene homopolymer.

22. A monomer/solvent separation and recycle process for a continuous homogeneous polymerization process comprising:
   providing one or more series or parallel homogenous polymerization reactors yielding one or more high-pressure reactor effluent streams and a downstream gravimetric separator fluidly connected to the one or more reactors;
   pressurizing a polymer-lean stream from the gravimetric separator to form a high-pressure polymer-lean recycle stream;
   splitting the high-pressure polymer-lean recycle stream into two high-pressure polymer-lean recycle streams;
   combining one of the high-pressure polymer-lean recycle streams with the one or more high-pressure reactor effluent streams to form a high-pressure reactor effluent mixed stream;
   heating the high-pressure reactor effluent mixed stream to form a heated high-pressure reactor effluent mixed stream;
   passing the heated high-pressure reactor effluent mixed stream through a pressure let-down valve to form a heated low-pressure reactor effluent mixed stream; and
   passing the heated low-pressure reactor effluent mixed stream through the gravimetric separator to form the polymer-lean stream for recycle and a polymer-rich stream for further processing.

23. The process of claim 22, wherein when passing the heated high-pressure reactor effluent mixed stream through the pressure let-down valve, the pressure is reduced to pass the lower critical solution temperature phase boundary.

24. The process of claim 22, further comprising recycling the second high-pressure polymer-lean recycle stream back to the one or more homogenous polymerization reactors.

25. The process of claim 22, wherein the heating of the high-pressure reactor effluent mixed stream is by one or more heat exchangers.

26. The process of claim 22, wherein the pressurizing of the polymer-lean stream from the gravimetric separator is by one or more high-pressure recycle pumps.

27. The process of claim 22, further comprising heating the one or more high-pressure reactor effluent streams through one or more heat exchangers before combining with the high-pressure polymer-lean recycle stream.

28. The process of claim 22, further comprising mixing the heated high-pressure reactor effluent mixed stream through a mixing device positioned before the pressure let-down valve.

29. The process of claim 28, wherein the mixing device is a static mixer or a mechanical agitation device.

30. The process of claim 22, wherein the pressure is dropped through the pressure let-down valve at a rate of at least 6 MPa/sec.

31. The process of claim 22, wherein at least one of the one or more series or parallel homogenous polymerization reactors produce polypropylene homopolymer.

* * * * *